(12) United States Patent
Droy et al.

(10) Patent No.: US 6,555,076 B1
(45) Date of Patent: Apr. 29, 2003

(54) BAUXITE ORE DIGESTION IN THE BAYER PROCESS

(75) Inventors: Bernard Droy, Marcq en Baroeul (FR); Dany Michaux, Frevent (FR)

(73) Assignee: Gea Kestner, Saint Quentin en Yvelines Cedex (FR)

( * ) Notice: Subject to any disclaimer, the term of this patent is extended or adjusted under 35 U.S.C. 154(b) by 0 days.

(21) Appl. No.: 09/601,854

(22) PCT Filed: Oct. 1, 1999

(86) PCT No.: PCT/FR99/02335
§ 371 (c)(1),
(2), (4) Date: Sep. 22, 2000

(87) PCT Pub. No.: WO00/20334
PCT Pub. Date: Apr. 13, 2000

(30) Foreign Application Priority Data

Oct. 1, 1998 (FR) .......................................... 98 12510

(51) Int. Cl.$^7$ ................................................. C01F 7/00
(52) U.S. Cl. ..................... 423/121; 423/122; 423/123; 423/127; 422/187
(58) Field of Search ................................ 423/121, 122, 423/123, 127; 422/187

(56) References Cited

U.S. PATENT DOCUMENTS

| 3,738,411 A | * | 6/1973 | Lazar |
| 5,027,891 A | * | 7/1991 | Fulford et al. |
| 5,545,384 A | * | 8/1996 | Harato et al. |

FOREIGN PATENT DOCUMENTS

| AU | 554 379 B | 8/1986 |
| EP | 0 335 707 A2 | 10/1989 |
| WO | WO 97/04849 | 2/1997 |

OTHER PUBLICATIONS

Droy, B., Evaporation Techniques in the Alumina Industry, Feb., 1994.
International Search Report, No date.

* cited by examiner

Primary Examiner—Steven Bos
(74) Attorney, Agent, or Firm—Cummings & Lockwood

(57) ABSTRACT

The process according to the invention to raise simultaneously to an optimum level the temperature and concentration of an aqueous medium intended for use in bauxite ore digestion in an alumina production plant according to the Bayer process, which includes successive phases (a) to (f) in which:

a) the aqueous medium coming from digestion containing pregnant liquor is cooled and evaporated in a multiple staged flash evaporation zone;

b) the sterile residue is separated, the aluminium trihydroxide is precipitated and the aqueous medium, consisting of spent liquor, intended for use in digestion is recovered;

c) if need be, the required quantity of water, additional to that already evaporated in phase (a) is eliminated by evaporation in a specific evaporation section;

d) the aqueous medium intended for use in digestion is heated in several stages;

e) the flash vapour generated in each of the stages of the evaporation phase (a) is used in each of the stages of the heating phase (d);

f) the aqueous medium intended for use in digestion coming from the heating phase (d) is heated by live steam.

is characterised in that, in addition to all these phases, a simultaneous heating and evaporation phase is carried out on the aqueous medium intended for use in digestion.

41 Claims, 15 Drawing Sheets

DIGESTION OF THE BAUXITE BY THE BAYER PROCESS WITHOUT A SPECIFIC EVAPORATION SECTION

DIGESTION OF THE BAUXITE BY THE BAYER PROCESS WITH A SPECIFIC EVAPORATION SECTION

BAUXITE ORE DIGESTION IN THE BAYER PROCESS

The invention involves the improvement of a continuous bauxite ore digestion process according to the Bayer process which enables the synchronised adjustment and optimisation of the temperature and the active caustic soda content in the aqueous medium to be used in digestion (also called attack liquor).

The invention also involves the improvement of the Bayer process digestion line used to recycle the weak caustic aqueous solution (called spent liquor) coming from the precipitation of aluminium trihydroxide, heating and concentrating it to an active caustic soda content complying with the objectives set by the User for bauxite digestion, in Bayer process digesters.

Throughout the description, the following definitions will apply:

the aqueous medium intended for use in digestion means both the spent liquor collected after the precipitation of $Al(OH)_3$ which is recycled after heating it and concentrating the active caustic soda to form the attack liquor and the slurry formed by mixing this attack liquor with the crushed bauxite;

the aqueous medium from digestion means the liquor with a high aluminate content coming from bauxite digestion, along with possible unattacked sterile matter to be eliminated, also called pregnant liquor.

STATUS OF THE TECHNIQUE

The Bayer process is the main technique for alumina production via the alkaline attack of bauxite. According to this process, which is continuous, the digestion of the bauxite is achieved by bringing about the solubilisation of the alumina under pressure and at an adequate temperature, in general at least 140° C. (depending on whether digestion is carried out at a low or high temperature, the temperature level depends on the grade of bauxite processed—bayerite or hydrargillite or gibbsite, and diaspore or boehmite). This digestion is brought about by means of an aqueous caustic soda solution (called attack liquor) which has an appropriate concentration of active caustic soda (expressed hereafter in g/l of active $Na_2O$). After digestion, an aqueous medium is obtained comprising a solution saturated in sodium aluminate (called pregnant liquor) and sterile impurities to be eliminated. This medium resulting from the digestion process is gradually cooled by multiple stage flash evaporation, then the pregnant liquor is separated from the phase of impurities which is discarded.

This phase of impurities makes up the unattacked residue of the ore (called red mud), which contains mainly various iron, silica and titanium oxides and metallic salts.

As for the pregnant liquor, it is cooled down to the required temperature and seeded with aluminium trihydroxide crystals to bring about the precipitation of the aluminium trihydroxide $Al(OH)_3$ from the sodium aluminate. After liquid-solid separation, the separated aluminium trihydroxide undergoes calcination to produce alumina $Al_2O_3$ and the weak sodium aluminate liquor (called spent liquor) is sent back to be used in digestion after adequate heating and concentration of its active caustic soda content.

In the Bayer process as it is implemented today, substantial problems still exist involving both:

the amount of energy required to bring the attack liquor up to the temperature level set by the User;

the reconcentration of the active caustic soda content in the spent liquor (to the optimal level for digestion, and appropriate to the set temperature) by the evaporation of a quantity of water ensuring the balance of the process.

With regard to the quantity of heat required to raise the bauxite attack liquor to the set temperature level, the spent liquor is heated mainly by recovery of the sensible heat given off during the cooling of the pregnant liquor returning from digestion, in a multiple stage flash evaporation system. But this recovered energy provides the spent liquor with a certain temperature level which proves insufficient and which has to be further raised by using live steam in a series of tubular heaters.

To illustrate this phenomenon, in the case for instance of digestion at 141° C., the spent liquor, which is heated and concentrated by evaporation in the heating zone (fed with the heat provided by the medium returning from digestion recovered by multiple stage flash evaporation) enters this zone at a temperature of between 80 and 90° C. and leaves it at a temperature of about 120° C.

This spent liquor, still not sufficiently heated, must therefore be raised to about 156° C. (for example) so that the attack medium formed by the mixture of the said liquor and the bauxite (heated to about 90° C.) reach the required temperature of 141° C.: this rise in temperature from 120° C. to 156° C. is achieved by using live steam in tubular heat exchangers.

As for the reconcentration by evaporation of the water from the spent liquor, this is necessary due to the fact that this recycled liquor:

is diluted by intakes of water into the cycle, for example for washing operations on the impurities and the $Al(OH)_3$ precipitate must have an optimal active caustic soda content (expressed in g/l of active $Na_2O$) for ore attack at the set temperature;

must be reconcentrated in such a way that the quantity of water present in the Bayer bauxite digestion cycle is kept as constant as possible.

This is why the excess water thus generated must be eliminated and this elimination is carried out by evaporation in at least one multiple stage flash evaporation zone, associated with a zone of tubular heat exchangers heated by flash vapour and, in addition, by live steam.

Thus, to heat and concentrate the spent liquor by evaporation, in the digester cycle of alumina production units (whether digestion is carried out at high or low temperatures) there is a multiple stage flash evaporation zone which enables the recovery of heat from the medium coming from digestion and its transfer to the medium intended for use in digestion (spent liquor) in a multiple stage flash evaporation zone made up of tubular heat exchangers in which the last stage is heated by live steam.

However, in addition to the flash evaporation zone previously mentioned, in many Bayer process alumina production units, there is also a (specific) evaporation section for the spent liquor—multiple stage flash (when the active caustic soda content is low) or multiple effect (in other cases), which completes the action of the said multiple stage flash evaporation zone. This specific evaporation section is fed with live steam and processes the spent liquor (which is at a temperature of about 80 to 90° C.) resulting from the precipiation of $Al(OH)_3$.

To be precise, the Bayer process, illustrated by the diagrams in FIGS. 1, 2 and 3, amounts to a succession of essential steps which, apart from a few slight differences, are to be found in all alumina production units operating according to this process.

In the rest of the account of the status of the technique, the heating and reconcentration of active caustic soda in the spent liquor will concern indiscriminately the said liquor alone and the slurry formed by the bauxite to be attacked and the said liquor.

According to FIG. 1 (which does not include a specific evaporation section), the bauxite intended for use in digestion is ground at point (A) to the adequate size (possibly in presence of a fraction of the attack liquor), then the ground bauxite is mixed at point (B) with the attack liquor forming a slurry which is heated indirectly by live steam.

The slurry thus produced is then gradually heated to the right temperature for the digestion of the bauxite in the multi-stage heating zone (C) (comprising tubular heat exchangers) using flash vapour from the multiple stage flashing zone (E) and in the final stage live steam.

This slurry is then introduced into the digestion zone (D) where it is kept at the set temperature for attack under pressure: this attack leads to the production of an aqueous medium consisting of the pregnant liquor and the unattacked impurities.

On leaving the digestion section (D), the slurry containing the pregnant liquor (at a high temperature and pressure) is flashed in the multiple stage flash evaporation zone (E) at gradually decreasing pressures down to a pressure close to atmospheric pressure. The vapour generated by flashing is collected at each pressure level corresponding to one stage and then condensed to be used in the multi-staged heating zone (C) to heat in sequence the attack medium. The slurry resulting from digestion, containing the pregnant liquor, flows counter-current to the attack medium. Thus, the first flashing stage (E) feeds the corresponding heating stage in zone (C) and so on from stage to stage (see FIG. 3).

But the vapour generated by the first flashing stage, due to its insufficient pressure, is unable heat the attack medium to the required temperature. For this reason, the final heating stage of the said attack medium is carried out by means of live steam just before it enters the digestion zone (D).

On leaving the multiple stage flash evaporation zone (E), the cooled aqueous medium, containing the pregnant liquor and the unattacked impurities, enters a dilution zone (F) which collects the waters used to wash the unattacked residue (containing sodium aluminate) coming from zone (N). Then the cooled aqueous medium is fed to a liquid-solid separation zone (G) where the pregnant liquor is separated from the unattacked impurities which make up the red mud.

The red mud, impregnated with pregnant liquor, is washed in the washing zone (N) and the washing water is sent to the previously mentioned dilution zone (F) to recover the pregnant liquor.

As for the pregnant liquor coming from zone (G), it undergoes a last separation in zone (H), it is then cooled in heat exchange zone (I) and finally seeded in zone (J) by seed crystals taken from separation zone (K). The aluminium trihydroxide $Al(OH)_3$ (from sodium aluminate) precipitates in the seeded pregnant liquor, placed in the right temperature conditions. The precipitation medium, comprising spent liquor and the $Al(OH)_3$ precipitate, undergoes separation in zone (K). The spent liquor is sent to heat exchanger (I) and the aluminium trihydroxide, after washing in zone (L), is subjected to calcination in zone (M), to obtain alumina $Al_2O_3$, the objective of the process.

At the outlet of heat exchanger (I), the spent liquor is fed with the ground bauxite into the mixing zone (M) where the active caustic soda content is adjusted (to compensate for losses in the digestion cycle). The resulting slurry passes through the different stages of heating, digestion and trihydroxide precipitation as described previously.

According to FIG. 2 which includes, as in FIG. 1, a multiple stage flash evaporation zone (E), but which differs in that it has a specific evaporation section (P), the routing of the bauxite digestion process in stages, from the grinding (A) and mixing (B) zones to the aluminium trihydroxide calcination zone (M), is the same as that described for FIG. 1.

But, contrary to FIG. 1, on the outlet of heat exchanger (I), the spent liquor is fed to the specific evaporation section (P), which is heated by live steam. This section is equipped with a multiple stage flash evaporation zone and a multiple stage or multiple effect heating zone, in which the required quantity of water is removed by evaporation, in addition to that already evaporated in the multiple stage flash evaporation zone (E) to ensure the water balance in the alumina production plant.

In FIG. 3, it is possible to see the staging of the flashing (E) and heating (C) zones and also the vapour links between the flashing zone (E) [from $FT_1$ to $FT_n$] and the heating zone (C) [from $H_1$ to $H_n$].

The aqueous medium (pregnant liquor) coming from digestion is cooled by evaporation in the multiple stage flash evaporation zone ($FT_1$ to $FT_n$), and the liquor with a low sodium aluminate content (spent liquor) collected after the precipitation and separation of $Al(OH)_3$ is heated in the staged heating zone ($H_n$ to $H_1$) and in heater $H_0$, fed with live steam, its temperature is raised to the level required to enable bauxite digestion, before being used in the mixing (B) and/or digestion (D) zones.

It is thus clearly apparent that:
  very large quantities of steam are consumed in the bauxite digestion cycle, and these quantities of steam are not used efficiently nor synchronously, which increases the cost price of the alumina produced.
  the User cannot optimise the synchronised adjustment of the temperature and active caustic concentration of the liquor intended for bauxite digestion.

It is evident from these major observations that, to reach the temperature and concentration levels set by the Bayer process for the attack medium, an approximately constant quantity of water (per ton of alumina produced) must be removed from the bauxite digestion cycle by evaporation. This evaporation phase can either be carried out totally in the multiple stage flash evaporation zone (E) on the pregnant liquor coming from the digestion section, or by adding to this multiple stage flash evaporation zone (E) a specific evaporation zone (P) to process the spent liquor.

In cases where a Bayer process alumina production unit is only equipped with a multiple stage flash evaporation zone (E), this leaves no room to manceuvre with regard to increased alumina productivity or to respond to the physical and chemical variations in the bauxite, as, in either case, to face such demands it would be necessary to increase:
  the active caustic soda content of the attack liquor
  or the quantity of water to be evaporated, i.e. increase the evaporation capacity of the multiple stage flash evaporation zone (E). As the total evaporation capacity of this zone (E) cannot flucuate freely to respond to demand, the installation of a specific evaporation section (P) becomes necessary to increase the total evaporation capacity of the plant: this increased evaporation capacity will raise the live steam consumption substantially.

In cases where the Bayer process alumina production unit is equipped with both a multiple stage flash evaporation zone (E) and a specific evaporation section (P), the demand for increased productivity also makes it necessary to increase the total evaporation capacity of the plant. To fulfil this requirement, the evaporation capacity of the specific evaporation section (P) has to be increased, which also brings about a substantial increase in the live steam consumption.

To illustrate the status of the technique better, EP-A-0335707 describes a recycling process for the spent liquor which, instead of the series of flash evaporation and associated heating stages, uses a different type of heat exchanger, implementing a medium (heat transfer fluid), to ensure heat transfer between the pregnant liquor and the spent liquor. Even if an increase in the quantity of heat transferred may be achieved, the problem, for example, of the use of the previously mentioned temperature differential between the last heating stage by flash vapour and the temperature of attack remains set and not completely solved. Consequently, this process does not allow the synchronised control of the temperature and of the concentration of active caustic soda of the attack liquor.

We also know from AU-554379 the technique of inserting one or more evaporation sections in the traditional Bayer process spent liquor recycling line. The section(s) include(s) at least one tubular heater fed with live steam associated with an expansion vessel.

This traditional recycling line includes:
several flashing stages intended to cool the pregnant liquor and generate vapour;
several heating stages intended to heat the spent liquor which flows counter-current to the pregnant liquor, each heating stage being fed with the vapour produced by each flashing stage;
a final heating stage fed with live steam and situated at the outlet of the last heating stage fed with flash vapour.

The evaporation section(s) include(s) one or more expansion vessels located at the outlet of one or more heating stages.

This line presents major drawbacks such as, for example:
the recycled liquor temperature and concentration levels required for ore digestion cannot be reached simultaneously by the means implemented;
only a fraction of the spent liquor is heated to a temperature higher than that of digestion before being mixed with the aqueous medium containing the bauxite to reach a temperature higher than the digestion temperature;
the fragmentation of the spent liquor leads to an increase in the number of tubular heaters required to achieve the desired performance: this means a rise in investment costs without providing any advantage as far as energy consumption is concerned.

DESCRIPTION OF THE INVENTION

Consequently, the invention, which concerns the Bayer process, pursues several aims to achieve the improvement of this process and also the improvement of the corresponding digestion line.

One of the aims of the invention is the simultaneous heating of the spent liquor to the required temperature and its concentration to an optimum value for the digestion of the bauxite ore.

A further aim of the invention is to make the process flexible to enable quick adaptation to variations in production.

A further aim of the invention is to allow the User to increase the evaporation capacity of the Bayer cycle significantly without a substantial rise in the live steam consumption.

A further aim of the invention is to provide an additional evaporation capacity in an existing Bayer plant, at a low investment cost, much lower than that required to install a specific evaporation section.

Finally, a further aim is to increase the energy efficiency of the Bayer process alumina production plant, while at the same time providing a larger quantity of water and protecting the environment by reducing alkaline discharges.

Improvement to the Bayer Process

The process according to the invention to raise simultaneously the temperature and concentration of an aqueous medium to the optimum level for the digestion of a bauxite ore in a Bayer process alumina production unit, which includes successive phases (a) to (f), in which:

a) the aqueous medium coming from digestion containing the pregnant liquor is cooled and evaporated in a multiple stage flash evaporation zone;

b) the sterile residue is separated, the aluminium trihydroxide is precipitated and the aqueous medium intended for use in digestion, consisting of spent liquor, is recovered;

c) if need be, a required quantity of water, further to that evaporated in phase (a), is eliminated by evaporation in a specific evaporation section;

d) the aqueous medium intended for use in digestion is heated in several stages;

e) the flash vapour generated in each of the stages of the evaporation phase (a) is used in each of the stages of the heating phase (d);

f) the aqueous medium intended for use in digestion coming from heating phase (d) is heated by live steam;

is characterised by the fact that, in addition to all these phases, a simultaneous heating and evaporation phase is achieved with the aqueous medium intended for use in digestion.

It is thus evident that processes for the continuous alkaline attack of bauxite, according to the status of the technique, including phases:

of multiple stage flash evaporation cooling [phase (a)] of the aqueous medium coming from digestion, and of staged heating [phase (d)] of the aqueous medium intended for use in digestion, by use of the vapour produced by successive flashing, whether they are equipped with a specific evaporation section (as in zone P of FIGS. 2 and 3 which consume live steam), or not, can be further improved and are improved by the invention thanks to the integration, into the previously mentioned phases, of a new simultaneous heating and evaporation phase of the aqueous medium intended for use in bauxite digestion, whose results may be measured:

in the obtaining of an aqueous medium intended for use in digestion, for which synchronised adjustment may be achieved for the active caustic soda content and temperature, to levels complying with the set objectives for said digestion;

in the substantial improvement of the energy efficiency of the Bayer process by the increase in the total evaporation capacity of the plant without any significant rise in the overall steam consumption [this overall consumption being defined by the addition of the live steam consumptions in mixing zone (B), in the specific evaporation zone (P) if applicable, and in the staged heating zone of phase (d)].

The simultaneous heating and evaporation phase, according to the invention, can be inserted at any point:

in the staged heating phase [phase (d) of the process] of the aqueous medium intended for use in digestion;

and/or in the specific evaporation phase [phase (c) of the process].

The specific evaporation section P [phase (c)] can be equipped with the same multiple stage flash evaporation apparatus as the evaporation phase (a) and as the staged heating [of phase (d)], or can be comprised of a multiple effect.

If the specific evaporation section is of the staged flashing type, it includes:

n stages of flash evaporators intended to generate the flash vapour and n heating stages intended to heat up the spent liquor coming from the precipitation of $Al(OH)_3$, each heating stage (which includes at least one tubular heater) using the vapour generated by each flashing stage of the same rank;

at least one final heating stage (which includes at least one tubular heater) fed with live steam and located at the outlet of the first heating stage fed with flash vapour.

If the specific evaporation section P includes a multiple effect, the simultaneous heating and evaporation phase is built into the digestion zone and any excess vapour produced by evaporation is used to feed one of the stages (effects) compatible with its operating pressure. A significant reduction in the live steam consumption of this multiple effect is obtained.

For this reason, according to the invention, this simultaneous heating and evaporation phase is built into the said staged heating phase of the digestion cycle and/or into the specific evaporation section, in such a way that:

it can receive the aqueous medium (spent liquor) to be heated and/or evaporated from the first stage of the heating zone (fed with live steam) and/or from at least one of the following stages of the said heating zone (fed with flash vapour), in particular from the first heating stage which is fed with flash vapour;

it can feed aqueous medium which has been heated and/or evaporated (attack liquor) to the bauxite digestion zone, or to the first stage (fed with live steam) of the heating zone which, in turn, will feed the bauxite digestion zone;

and/or it can feed aqueous medium (spent liquor) to the heater rank n in the heating phase (d) when it is built into the specific evaporation section of phase c).

The best point for the installation of the simultaneous heating and evaporation phase is determined by a prior detailed survey of the plant which brings to light the main advantages. However, it has been noted that the simultaneous heating and evaporation phase according to the invention is frequently installed between the last heating stage fed with live steam and the first heating stage fed with flash vapour.

The vapour produced (in additional quantities as compared with the status of the technique) by the said simultaneous heating and evaporation phase, can be:

used in situ in said phase according to the invention;

and/or used in at least one of the heating stages of phase c) and/or phase d) and/or in particular, in the first stage of heating fed with live steam;

and/or used in at least one tubular heater installed for this purpose between at least two of the tubular heaters rank (K) and (K−1) in phase d) and/or phase c) (K having a value of between 1 and n);

and/or consumed, in case of an excess in one of the effects of the multiple effect in phase c) bringing about a reduction in the live steam consumption of said effect;

and/or used to produce high temperature hot water (from 80 to 98° C. for example) and/or to heat the spent liquor used to prepare the bauxite slurry.

Thus, and compared with the status of the technique illustrated in FIGS. 1, 2 and 3 the simultaneous heating and evaporation phase according to the invention is built into one and/or the other of the staged heating zones c) and/or d) of the Bayer process.

The simultaneous heating and evaporation phase according to the invention includes at least one stage, that is to say one stage (simple effect) or several stages (multiple effects) of simultaneous heating and evaporation, each stage being composed of one or several simultaneous heating and evaporation means operating in series or parallel.

Integration of the Simultaneous Heating and Evaporation Phase in the Heating Zone [Phase (d)] Prior to Digestion In case, for example, of the presence of one single stage for the simultaneous heating and evaporation phase according to the invention, the said phase can be preferentially integrated between the first stage of the heating zone (fed with live steam) and the mixing and/or bauxite digestion zone. The vapour generated by the said phase is used in said phase.

Finally, it is possible in certain cases to implement one single stage complying with the invention, this stage being made up of at least two simultaneous evaporator-heaters, operating in series or in parallel for the liquor phase and under the same operating pressure for the vapour phase.

If the simultaneous heating and evaporation phase of the aqueous medium intended for use in digestion is made up of at least two stages, one of these stages can be installed between the outlet of the live steam heating phase [phase (f)] and the inlet of the mixing and/or bauxite digestion zone and another of the said stages can be located between the outlet of the first of the stages of the flash vapour heating phase [phase (d)] (vapour generated by the cooling phase a) and the inlet of the live steam heating phase [phase (f)].

However, it is also possible that one of the stages being located on the outlet of the live steam heating phase [phase (f)] and the inlet of the mixing and/or bauxite digestion zone, the other stages be placed between the outlet of the first of the stages of the flash vapour heating phase [phase (d)] [vapour generated by the cooling (phase a)] and the inlet of the live steam heating phase [phase (f)].

Finally, it is also possible, when the simultaneous heating and evaporation phase includes at least two stages, that the said stages be located between the inlet of the live steam heating phase [phase (f)] and the outlet of the first of the stages of the flash vapour heating phase [phase (d)].

When there are at least two stages in the simultaneous heating and evaporation phase according to the invention, the vapour generated by one of the simultaneous heating and evaporation stages is used to feed the preceding simultaneous heating and evaporation stage., and so on from one to the next.

Whatever the number of stages implemented in the simultaneous heating and evaporation phase for the aqueous medium intended for bauxite digestion, the first stage of the simultaneous heating and evaporation phase is fed with live steam.

Integration of the Simultaneous Heating and Evaporation Phase into the Specific Evaporation Section P When the Bayer process alumina production unit is equipped with a specific evaporation section in addition to the staged evaporation zone existing in the bauxite digestion zone to heat and concentrate the spent liquor, the simultaneous heating and evaporation phase according to the invention can also be implemented here and can include one or several stages if the said evaporation zone is equipped with a multiple stage flash evaporation section.

If there is, for example, one single stage (single effect) for the simultaneous heating and evaporation phase according to the invention, the said phase can be placed between the first stage of the heating zone (fed with live steam) of the said section and the first heating stage fed with flash vapour. The vapour generated by the said phase is consumed in the said phase.

As already mentioned, it is possible to implement one single stage from at least two simultaneous evaporator-heaters in the previously given conditions.

If the simultaneous heating and evaporation phase for the aqueous medium intended for bauxite digestion includes at least two stages (double effect), one of the stages may be located between the outlet of the live steam heating phase [phase (c)] and the inlet of the heating stage rank n of heating phase (d) and another of the said stages may be situated between the outlet of the first stage of the flash vapour heating phase (c) and the inlet of the live steam heating stage of phase (c).

But, it is also possible that one of the stages, being placed at the outlet of the live steam heating phase [phase (c)] and the inlet of the heating stage rank n of heating phase (d), the other stages be located between the outlet of the first of the flash vapour heating stages [of phase (c)] and the inlet of the live steam heating phase [of phase (c)].

Finally, if the simultaneous heating and evaporation phase includes at least two stages, it is possible that the said stages be placed between the inlet of the live steam heating phase (of phase c) and the outlet of the first of the stages of flash vapour heating phase [phase (c)].

In case of at least two stages in the simultaneous heating and evaporation phase according to the invention, the vapour generated by one of the simultaneous heating and evaporation stages is used to feed the preceding simultaneous heating and evaporation phase, and so on from one to the next.

Whatever the number of stages implemented in the simultaneous heating and evaporation phase, the first stage of the simultaneous heating and evaporation phase is fed with live steam.

Finally, the excess vapour generated by the stage(s) of the simultaneous heating and evaporation phase can be used as previously indicated, save for its application in the multiple effect.

The simultaneous heating and evaporation of the aqueous medium intended for bauxite digestion in the particular phase according to the invention, can be carried out preferentially by the use of a tubular falling film evaporator. This heated film is entrained, from top to bottom, not only by gravity, but also mechanically by the vapour generated in situ from the said film resulting in the separation of the concentrated liquid and the vapour generated in situ.

A previous heating stage of the aqueous medium to be heated and concentrated may be associated with the simultaneous heating and evaporation phase, upstream of same, by direct contact of the vapour generated by the said phase and the aqueous medium.

The process as presented can be used even if the bauxite is introduced into the spent liquor before it is fed to the multi-stage heating zone.

Improvement of the Bayer Process Digestion Line

The invention also involves a line of apparatus to bring an aqueous medium intended for Bayer process bauxite ore digestion up to an adequate temperature and concentration by evaporation in an alumina production unit.

As is widely known, this line includes (according to FIG. 3):

a zone of staged evaporators-flash tanks, installed in series, in which circulates the aqueous medium coming from bauxite digestion;

a zone of staged heaters, installed in series and in which the aqueous medium intended for bauxite digestion circulates counter-current to the afore-mentioned zone, each heater being fed with the flash vapour from each corresponding evaporator-flash tank;

one or more heaters connected to a source of live steam and linked up to the inlet of an apparatus for the mixing and/or digestion of ground bauxite with attack liquor, to raise this liquor, coming from the outlet of the first of the heaters of this series of heaters fed with flash vapour, to the temperature required for digestion;

a specific evaporation section equipped with a zone comprising a multiple effect or a zone of staged evaporator-flash tanks, in which flows the aqueous medium (spent liquor coming from $Al(OH)_3$ precipitation) to be heated and evaporated and a zone of staged heaters installed in series through which the said spent liquor circulates., each heater being fed with the flash vapour from the corresponding evaporator-flash tank.

But, according to the invention, this line differs from the status of the technique and is characterised by the fact that a simultaneous heating and evaporation section for the aqueous medium intended for bauxite digestion (spent liquor to be heated and concentrated) is built into it, both in the heating zone of phase (d) of the Bayer process and in the specific evaporation section of phase (c) of said process, when the latter is made up of multiple stage flash evaporators.

This simultaneous heating and evaporation section can be installed at any point in one and/or the other of the phases (c) and (d) of the staged heating section, but chosen judiciously for each case, after a needs analysis.

This section according to the invention is connected to the staged heating section in such a way that:

it can receive the aqueous medium (spent liquor to be heated and/or evaporated) coming from the first stage fed with live steam in the zone of staged heaters in phases (c) and/or (d) and/or at least one of the following stages of the said heating zone, fed with flash vapour and, in particular, the first of them;

it can feed the aqueous medium (attack liquor) once it has been heated and/or evaporated according to the desired and set conditions, either directly to the zone where mixing and/or bauxite digestion take place, or indirectly via an intermediate connection to the first stage (fed with live steam) of the heating zone, the latter feeding the aqueous medium heated and/or evaporated to the digestion zone as required for digestion, or else to the heater rank n of phase (d) of the process.

The simultaneous heating and evaporation section (for the aqueous medium intended for use in digestion) in accordance with the invention, is fed partly with live steam and in turn generates vapour which is:

consumed in the said section;

and/or used in at least one of the heating stages of phases c) and/or d) and/or, in particular, in heater $H_0$, combining the live steam feed of the said heater with all or part of the vapour produced in the said simultaneous heating and evaporation section;

and/or used in at least one tubular heater specially installed for this purpose between at least two heaters in phases (c) and/or (d);

and/or consumed in case of excess production in one of the effects of the multiple effect in phase (c);

and/or used to produce hot water to heat the spent liquor entering into the preparation of bauxite slurry by appropriate means.

The simultaneous heating and evaporation section (of the aqueous medium intended for use in digestion) includes at least one simultaneous heating and evaporation stage, that is to say a stage (simple effect) or several simultaneous heating and evaporation stages (multiple effects), each stage being composed of one or several simultaneous heating and evaporation means operating in series or in parallel. If the section according to the invention has one single simultaneous heating and evaporation stage (single effect), the said stage can be preferentially installed:

for phase d) between the first heater (of the heating zone) fed with live steam and the mixing and/or bauxite digestion zone;

and/or for phase (c) between the first heater fed with live steam and the inlet of the heater rank n of phase d). The vapour generated by the said stage according to the invention is used in situ.

If the simultaneous heating and evaporation section according to the invention has two stages (double effect) then the two stages can be installed for phase (d) between the outlet of the heater fed with flash vapour at the highest pressure and the inlet of the mixing and/or bauxite digestion zone;

and/or for phase (c) between the first heater fed with live steam and the inlet of the heater rank n of phase (d).

But, it is also possible, in cases where the simultaneous heating and evaporation section includes two stages, that one of the stages being installed at the outlet of the first heater fed with live steam in phases (c) and/or (d), the other stage be installed between the outlet of the first of the heaters in the heating zone [phases (c) and/or (d)] fed with flash vapour (generated by the cooling phase) and the inlet of the first heater fed with live steam.

Finally, it is also possible, in cases where the simultaneous heating and evaporation section includes two stages, that these stages be installed between the inlet of the first heater fed with live steam and the outlet of the first of the heaters fed with flash vapour [phase (c)] in the heating zone of phases (c) and/or (d).

If, for example, the section according to the invention includes three stages or more, the first stage is installed as indicated previously, in phases (c) and/or (d). The second and third stages and other stages can be installed in series between the outlet of the first heater in the series of heaters fed with flash vapour and the inlet of the heater fed with live steam.

Whatever the number of stages (effects) in the section according to the invention:

the first stage of the section is fed with live steam;

the vapour generated in each stage of the section is used to feed the preceding simultaneous heating and evaporation stage and so on from one to the next, or yet again to feed vapour, when in excess, to an external user as indicated previously.

Preferentially, each simultaneous heating and evaporation stage for the aqueous medium intended for use in digestion is falling film and includes, in it upper part, a vertical shell and tube heat exchanger and a distribution system for the falling film of aqueous medium intended for use in digestion and, in the lower part, a liquid-vapour separator enabling the separation of the concentrated aqueous medium from the vapour generated, which may be reused.

Each stage of simultaneous heating and evaporation according to the invention can be preferentially equipped upstream with a heater for the said aqueous medium by direct contact of said medium with the vapour generated in the said simultaneous heating and evaporation stage. In this case, the said direct contact heater is connected to the said simultaneous heating and evaporation stage, to ensure the circulation of the aqueous medium intended for use in digestion, and the heater by direct injection of the vapour produced by the said simultaneous heater-evaporator.

Thus a complete plant for alumina production according to the Bayer process can be improved thanks to the invention, by the integration of the means required for the simultaneous heating and evaporation of the aqueous medium intended for digestion, these means allowing the synchronised adjustment of the temperature and concentration of the active caustic soda in the said aqueous medium.

The invention offers the additional advantage of the possibility of installing it in existing alumina production lines, by using simple branch connections without having to make any other technological modifications to the line.

Other advantages as regards the process and the recycling line according to the invention will appear on reading the detailed description of the invention, while referring to the drawings provided as an illustration, in which:

FIG. 4 shows an alumina production plant according to the status of the technique (Bayer process) equipped with the improvement according to the invention, including:

the successive cooling phases by multiple stage flash evaporation of the aqueous medium coming from digestion, the staged heating of the aqueous medium going to bauxite digestion, by using the previously mentioned flash vapour;

the simultaneous heating and evaporation phase according to the invention of the aqueous medium intended for bauxite digestion to raise simultaneously the temperature and concentration of the active caustic soda in the said medium to the optimum levels.

FIGS. 5 and 6 show the same alumina production plant in accordance with the status of the technique (Bayer process), equipped with the improvement according to the invention, in two versions:

one illustrated in FIG. 5, in which the simultaneous heating and evaporation phase according to the invention:

is fed with aqueous medium intended for use in digestion via the outlet of the first of the stages of the flash vapour heating phase [phase (d)];

and feeds, after having subjected the said aqueous medium for bauxite digestion to simultaneous heating and evaporation, to the inlet of the live steam heating phase (first heater).

the other illustrated in FIG. 6, in which the simultaneous heating and evaporation phase according to the invention:

is fed by the first heater of the heating phase by live steam;

and feeds, after having subjected it to simultaneous heating and evaporation, to the mixing and/or bauxite digestion zone.

DETAILED DESCRIPTION OF THE INVENTION

As a preliminary statement, it must be remembered that, within the Bayer process, there are many industrial design variables in alumina production by alkaline bauxite digestion depending on composition. The notable differences between these variations in process mainly concern the active caustic soda content in the attack liquor, the temperature level of the aqueous medium and the duration of digestion. These versions differ also one from the other in the results that they offer, in particular, the production output, the energy efficiency and the quality of the alumina produced.

Since the invention consists in the integration of a simultaneous heating and evaporation section in the digestion line, it applies, with the same quality of results, to all the versions of the Bayer process, the digestion temperatures and the liquor concentrations as indicated in particular are not a restriction of the invention.

Figure 3:
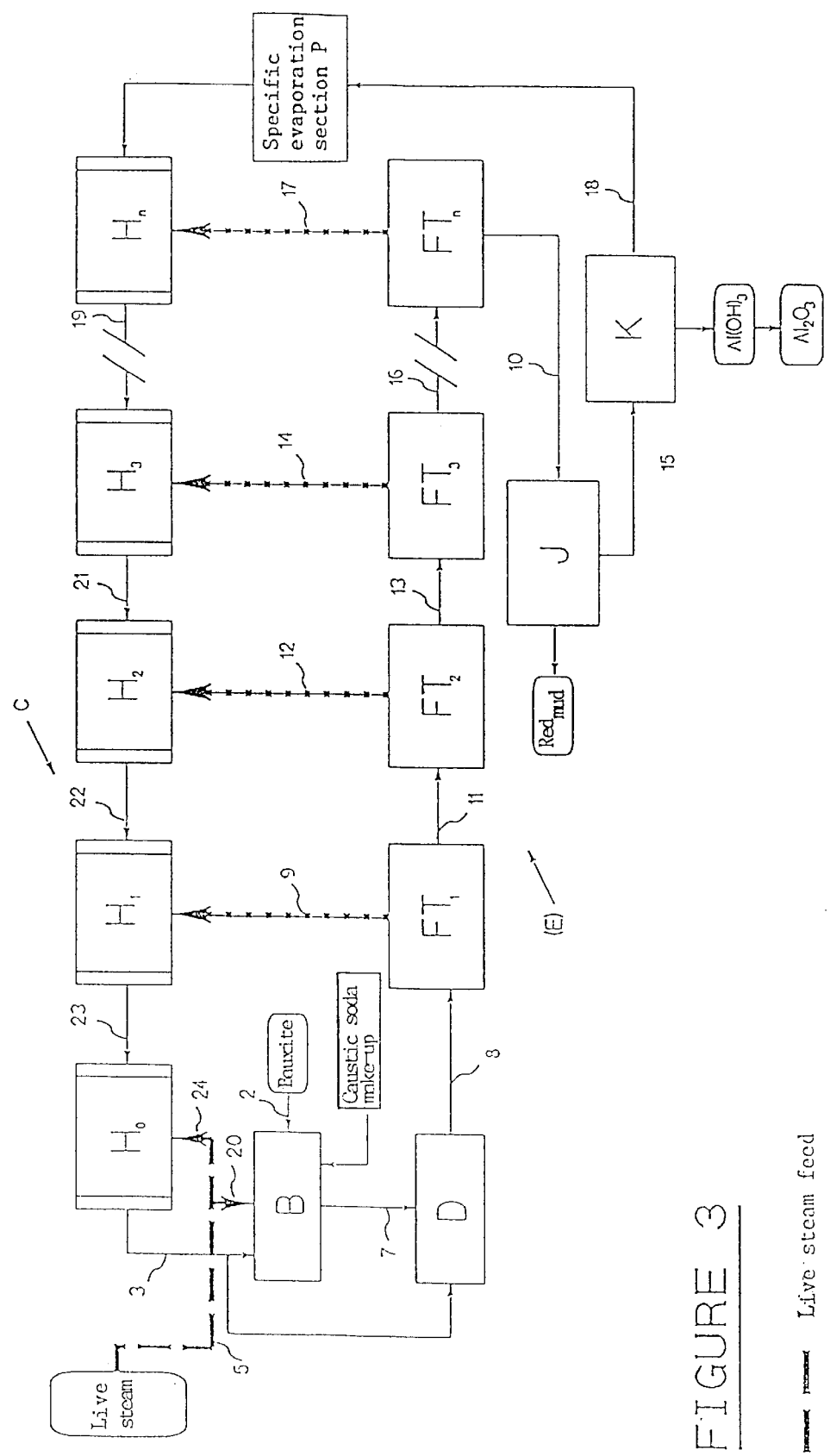
Figure 4:
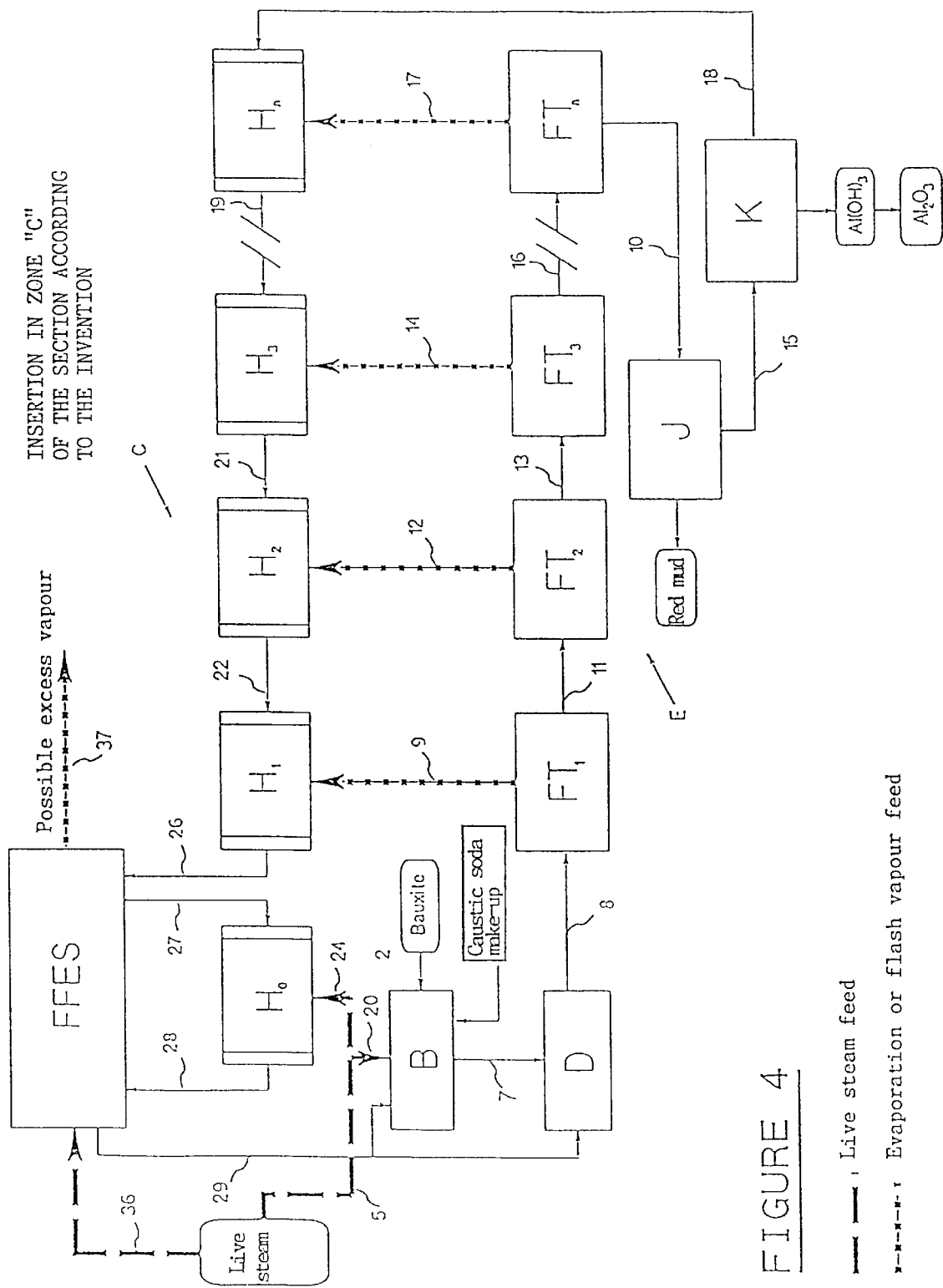
Figure 8:
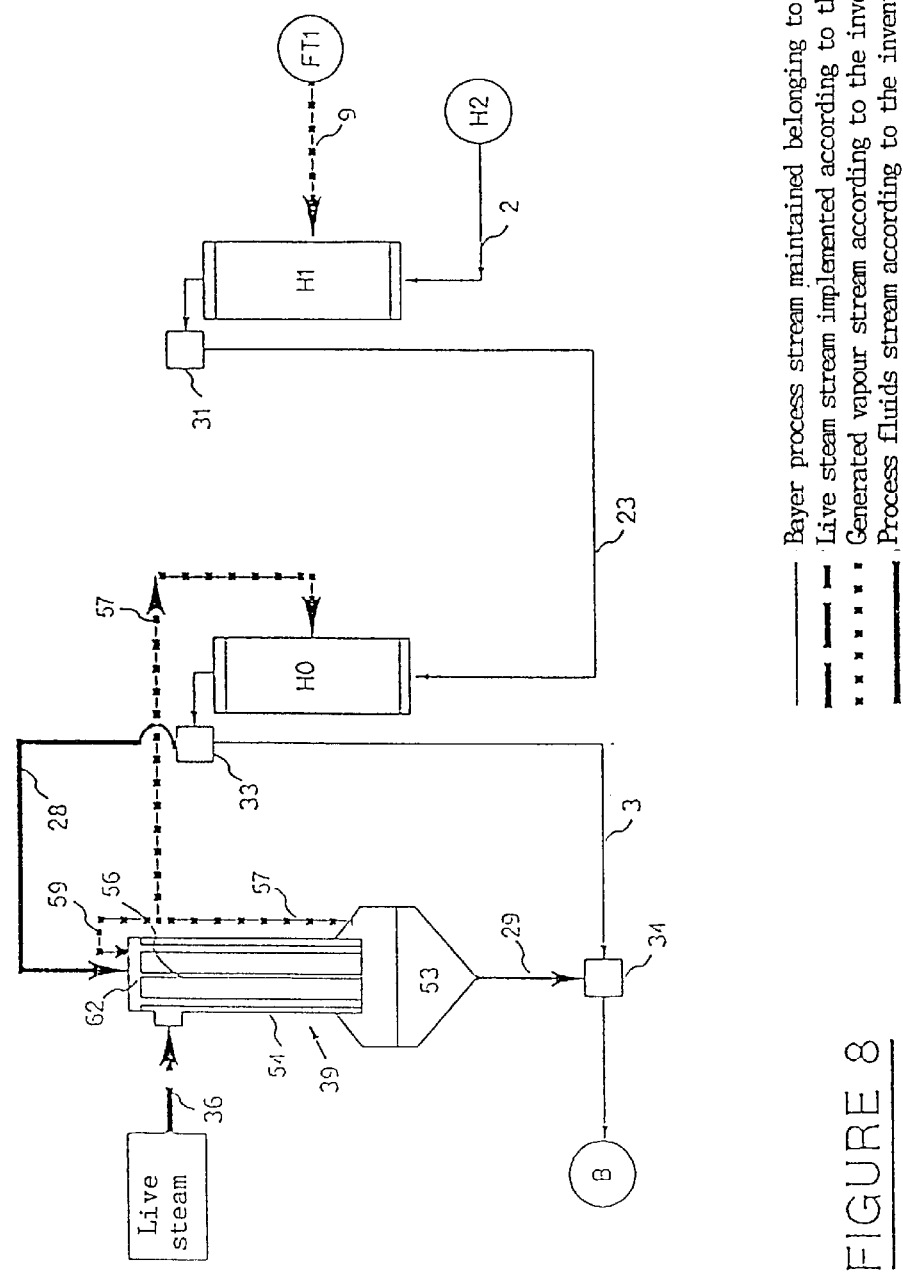
FIG. 8 shows in detail the single stage simultaneous heating and evaporation phase (one effect).

According to FIGS. 4 and 8, the devices which make up an alumina production plant according to the Bayer process, that is to say, in accordance with the status of the technique (FIG. 3) they include, as is widely known, first of all a mixer B, in which the bauxite ore arriving via supply line 2 is mixed with at least part of the attack liquor (containing active caustic soda) coming from the recycling line via supply line 3. The bauxite is previously preheated to a low temperature (between 75 and 80° C.) and the mixture of bauxite and attack liquor is heated in (B) by live steam (fed via lines 5 and 20) from the live steam source.

In all figures, the circulation routes
for live steam are shown by broken lines
for flash vapour or evaporation vapour are shown by dotted lines Via line 7 the slurry from (B) is fed to a reactor (D) where the bauxite is digested by the hot attack liquor (at about 145° C.) under pressure. To ensure the optimum concentration of caustic soda in the attack liquor (compensation for losses occurring throughout the alumina production process), mixing zone B if fed not only with attack liquor (via line 3) but also with fresh active caustic soda.

From reactor D the aqueous medium coming from digestion, made up of pregnant liquor containing sodium aluminate in solution and unattacked sterile residue, is removed via line 8 and sent to a series (E) of flash tanks-evaporators FT, operating according to the staged flashing principle. The successive flash tanks-evaporators $FT_1$ to $FT_n$ (connected in series) produce vapour, by flashing the aqueous medium from digestion, which is used to heat a series (C) of tubular staged heaters $H_1$ to $H_n$ (also connected in series).

Thus, flash tank-evaporator $FT_1$ receives the aqueous medium resulting from digestion at a temperature of about 145° C. via line 8. In flash tank-evaporator $FT_1$, the temperature of said aqueous medium falls from about 145 to 135° C. and produces flash vapour. This vapour, at a temperature of about 128° C., is fed to heater $H_1$ via line 9.

Similarly, flash tank-evaporator $FT_2$ receives the aqueous medium coming from $FT_1$ at a temperature of about 135° C. via line 11. In flash tank-evaporator $FT_2$ vapour is produced by flashing the aqueous medium and is fed via line 12 to heater $H_2$. The same occurs in flash tank-evaporator $FT_3$, which receives the hot aqueous medium from flash tank-evaporator $FT_2$ via line 13 and feeds flash vapour to heater $H_3$ via line 14.

The flashing cycle continues thus: the flash tank-evaporator $FT_n$ receives the aqueous medium from flash tank-evaporator $FT_{n-1}$ via line 16 and feeds flash vapour via line 17 to heater $H_n$.

The flash cooled aqueous medium is then sent via line 10 to a solid-liquid separation section F in which the pregnant liquor is separated from the red mud. The said pregnant liquor, at a temperature of about 75–80° C. and void of insolubles, then passes through line 15 to section K for aluminium trihydroxide $Al(OH)_3$ precipitation (subsequently transformed into alumina $Al_2O_3$ by calcination).

The precipitation of the $Al(OH)_3$ in section K is followed by liquid-solid separation which produces spent liquor, in addition to the aluminium trihydroxide. The active caustic soda content of this spent liquor, intended for recycling to bauxite digestion, must be reconcentrated by water evaporation and raised to a temperature higher than that required for bauxite digestion so as not to disturb the physical and chemical conditions of the attack medium. Thus the spent liquor is sent from the precipitation-separation section K to a first heater $H_n$ via line 18.

The spent liquor then circulates from heater $H_n$ to heater $H_{n-1}$ via line 19, and so on in series, from heater $H_3$ to heater $H_2$ via line 21, then from heater $H_2$ to heater $H_1$ via line 22. Each heater H is fed with vapour from the flash tank-evaporator FT which is directly associated with it. On the outlet of heater $H_1$ the temperature of the liquor intended for use in digestion is about 120° C. Thus, the spent liquor to be regenerated passes from heating stage to heating stage from about 80° C. to about 120° C., but its temperature is still too low for it to be used as attack liquor.

As the temperature of the bauxite fed to B is insufficient, the temperature of the attack liquor must be raised from about 120° C. to about 156° C. to obtain a temperature of about 145° C. in the attack medium, formed by the mixture of bauxite and the attack liquor, at the actual time of digestion. To achieve this, at least one tubular heater $H_0$ is used connected via line 23 (see FIG. 3) to heater $H_1$ and to the live steam source via line 24. The liquor intended for use in digestion is fed from heater $H_0$ via line 3 to mixing zone B, which in turn feeds the digester (D) via line 7. The digestion cycle is thus completed and the alumina production unit is in continuous operation.

According to the invention (FIG. 4) a new simultaneous heating and evaporation section (Falling-Film Evaporation Section) for aqueous attack medium is built into the previously mentioned Bayer process digestion unit. Thus a branch connection is made between heaters $H_1$ and $H_0$ and between heater $H_0$ and the mixing zone (B). From heater $H_1$ the spent liquor is fed via line 26 to the FFES section (and no longer passes through line 23 as per the status of the technique according to FIG. 3. The aqueous medium for digestion is fed via line 27 from the simultaneous heating and evaporation section FFES to heater $H_0$ (fed with live steam via line 24). At the outlet of heater $H_0$ line 28 feeds the aqueous medium for digestion to the simultaneous heating and evaporation section FFES. The aqueous medium for digestion leaves the FFES section via line 29 at a temperature and concentration appropriate for digestion and enters the mixing zone B from where it is fed via line 7 to the digester (D).

The simultaneous heating and evaporation section FFES is fed with live steam via line 36. The vapour generated in the simultaneous heating and evaporation section FFES by the evaporation of the aqueous medium intended for use in digestion is consumed in situ and any excess is recovered via line 37 for at least one of the uses mentioned previously.

Figure 5:
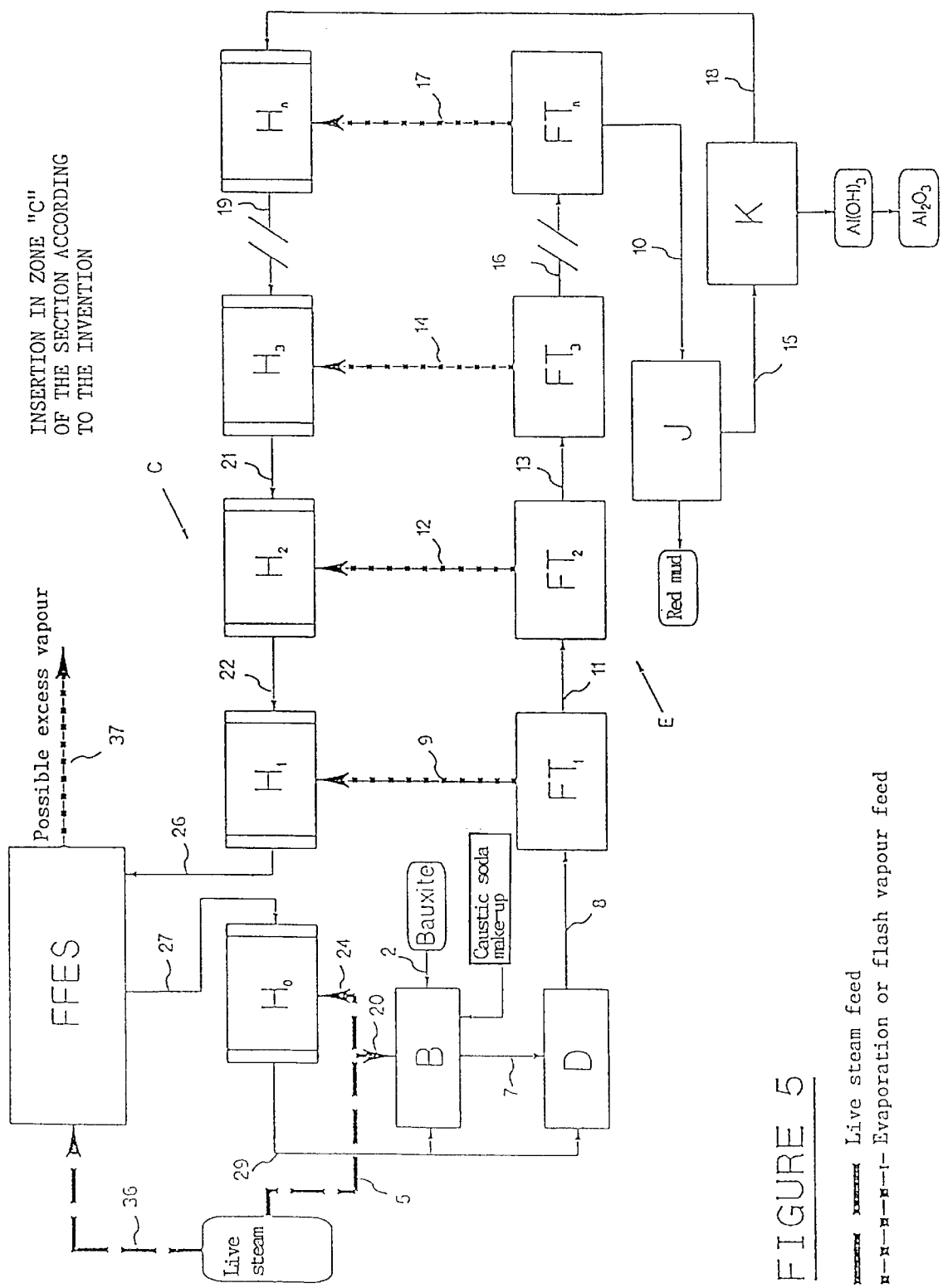

According to FIG. 5, specific to the invention, the simultaneous heating and evaporation section is also built into the Bayer process digestion section. Thus a branch connection was made between heaters $H_1$ and $H_0$. From heater $H_1$ the spent liquor is fed via line 26 to the FFES section. Via line 27 the aqueous medium for digestion is fed from the simultaneous heating and evaporation section FFES to heater $H_0$ (fed with live steam by line 24). At the outlet of $H_0$ (differing from FIG. 4) line 29 takes the aqueous medium for digestion at optimum temperature and concentration, partly to the mixing zone B and partly to the digester D, while the slurry leaving B is fed via line 7.

Figure 6:
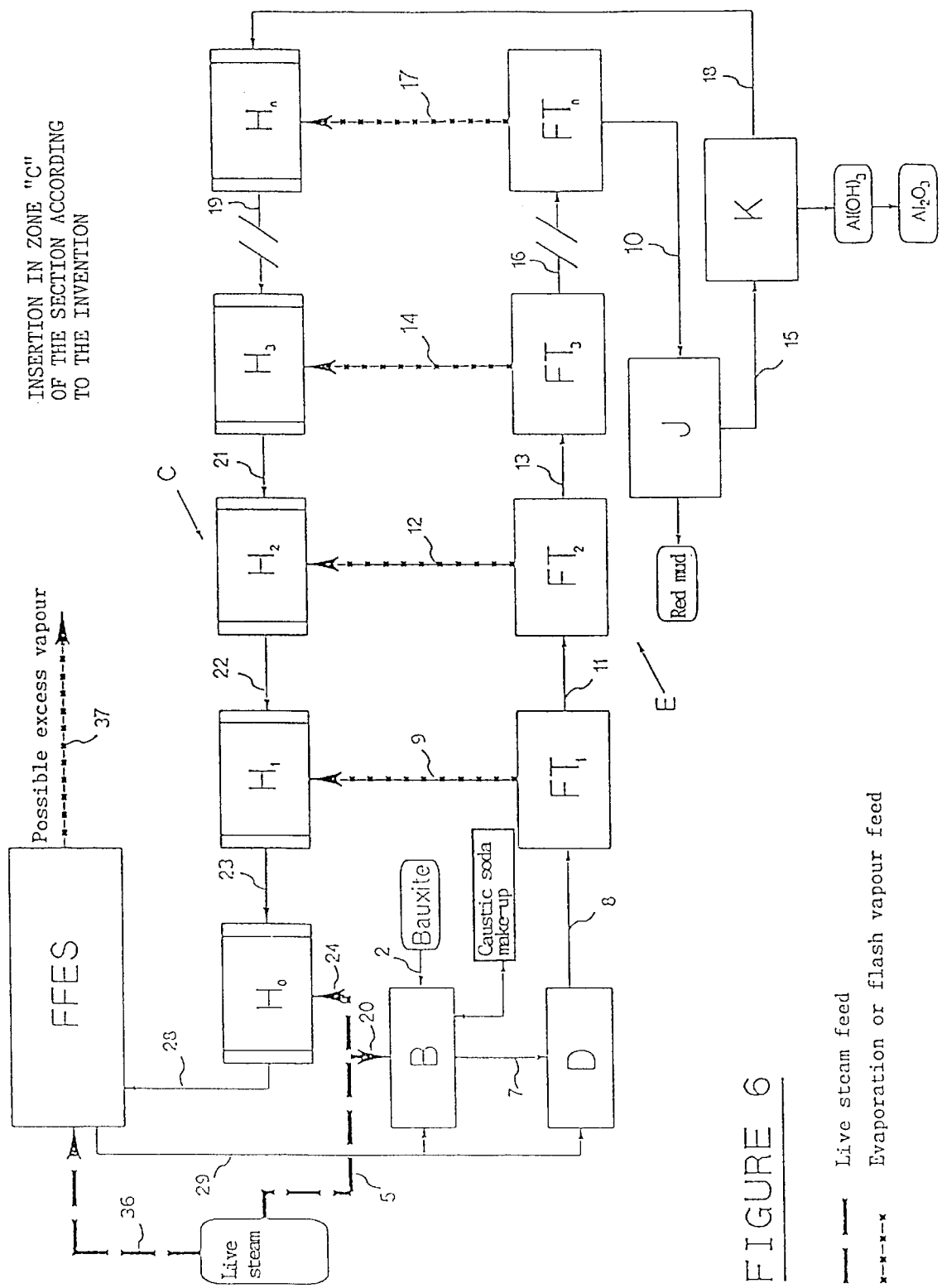

According to FIG. 6, concerning the invention, the simultaneous heating and evaporation section is also built into the Bayer process digestion section. But, unlike FIGS. 4 and 5, a branch connection is made between heater $H_0$ and mixing zone B. From heater $H_1$ the spent liquor flows through line 23 to heater $H_0$ (which is fed with live steam by line 24). On the outlet of heater $H_0$, a line 28 brings the aqueous medium for attach to the simultaneous heating and evaporation section FFES. Line 29 leaving section FFES takes the aqueous medium for digestion, now at optimum temperature and concentration for digestion, to mixing zone B then to digester D.

Figure 7:
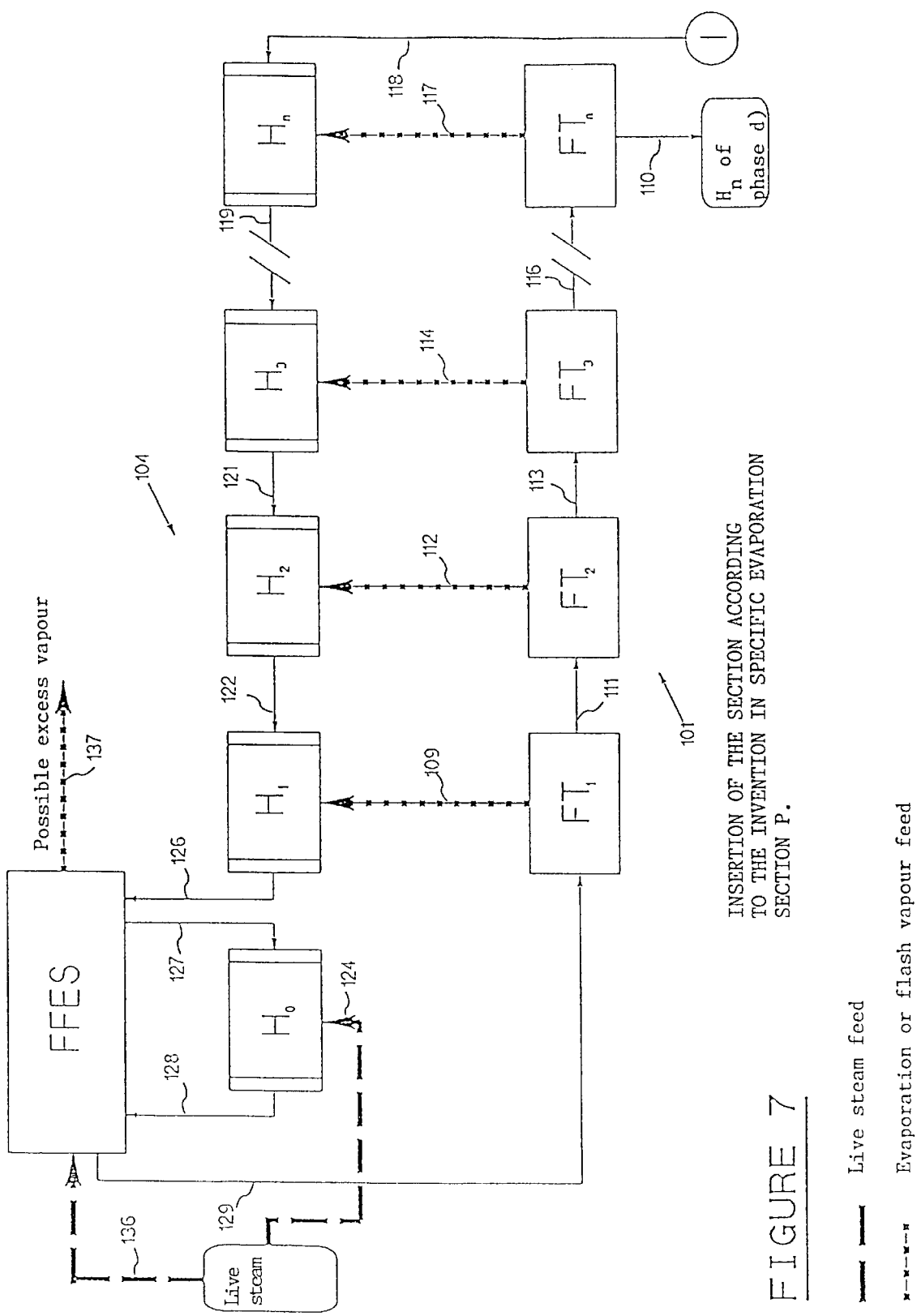
FIG. 7 shows a specific evaporation section, installed in an alumina production unit according to the status of the technique (FIG. 3), the said specific evaporation section being equipped with the improvement according to the invention (phase FFES).

FIG. 7, applying to the invention, shows the case where the simultaneous heating and evaporation section FFES is built into a specific evaporation section (P), existing in an alumina production unit according to FIG. 3 of the status of the technique.

According to this FIG. 7, which concerns phase c) of the Bayer process, the specific evaporation section (P) is equipped with a series (104) of staged heaters with increasing temperatures ($H_n$ to $H_1$), and a series (101) of multiple stage flash evaporators ($FT_1$ to $FT_n$).

The spent liquor, coming from the $Al(OH)_3$ precipitation and separation zone (I). enters via line 118 into heater $H_n$ of the said section, and progressively heats as it flows from heater $H_n$ to heater $H_1$ via lines 119, 121 and 122.

The simultaneous heating and evaporation section according to the invention is integrated into this set up by means of a branch connection between heaters $H_1$ and $H_0$ on one hand and between heater $H_0$ and flash evaporator $FT_1$ on the other hand.

From heater $H_1$, the spent liquor flows via line 126 to the FFES section (and no longer via line 23 of the status of the technique as per FIG. 3). The spent liquor is sent via line 127 from the simultaneous heating and evaporation section FFES to heater $H_0$ (fed with live steam by line 124). On the outlet of heater $H_0$ line 128 takes the aqueous medium intended for use in digestion to the simultaneous heating and evaporation section FFES. On leaving the FFES section via line 129 the liquor has reached the optimum temperature and concentration in the series of staged flash evaporators.

The successive staged flash evaporators $FT_1$ to $FT_n$ (connected in series) produce vapour by flashing the liquor coming from the FFES section which is used to heat the series 104 of staged tubular heaters $H_1$ to $H_n$. Thus the flashing cycle is achieved from one to the next, the liquor flowing from evaporator $FT_1$ to evaporator $FT_n$ via lines 111, 113, 116 . . .

The liquor cooled by staged flashing, leaving $FT_n$ is reintroduced via line 110 upstream of heater $H_n$ of phase d) of the Bayer process. Each heater H is fed with vapour from the flash evaporator FT which is directly associated with it, heater $H_0$ being fed with live steam.

The simultaneous heating and evaporation section FFES is fed with live steam by line 136 from the source of live steam. The vapour generated in the simultaneous heating and evaporation section FFES by the evaporation of the liquor to be heated and concentrated, is used in situ in the said phase.

In case of a possible excess of vapour generated in the FFES section, this excess is sent by line 137 to at least one of the vapour consuming zones, such as those indicated previously, for example phase (d) of the Bayer process.

FIGS. 8 to 15 of the simultaneous heating and evaporation section with one or more stages, described hereafter, concern the integration of the said section both in phase (c) (specific evaporation section) and phase (d) (digestion section) of the Bayer process: the description was deliberately restricted to phase (d) of the said process, but it also applies in the same way to phase (c) of the said process when the latter is equipped with multiple stage flash evaporation.

FIG. 8, specific to the invention, illustrates the case in which the simultaneous heating and evaporation section FFES has one single stage (39) (that is to say a single effect). This stage 39 is inserted between heater $H_0$ and mixing zone B and includes a simultaneous heater-evaporator 54 which operates according to the falling film principle.

The spent liquor coming from heater $H_0$ is fed to the top of the said simultaneous heater-evaporator 54 via line 28.

Simultaneous heater-evaporator 54 includes a vertical shell and tube surface heat exchanger 56 and a liquid-vapour separator 53. Exchanger 56 is equipped with numerous tubes with a nominal bore of between 30–50 mm and a length of between 8 to 15 metres. The spent liquor is distributed in the upper section by means of an appropriate system, and the mixture formed by the said liquor and the vapour falls down the length of the tubes. The liquor concentrates by evaporation and leaves via the bottom of the tubes from where it flows to the liquid-vapour separator 53. The vapour coming from liquid-vapour separation in 53 is partly used to feed tubular heater $H_0$ via line 57, the other part is reinjected via line 59 into the upper section of the simultaneous heater-evaporator. The heating zone of exchanger 56 is fed with steam from the live steam production unit LS.

The bottom of the liquid-vapour separator 53 is equipped with a pipe 29 which sends the liquor, at the optimum temperature and concentration for digestion, to the mixing (B) and digestion (D) zones.

Figure 9:
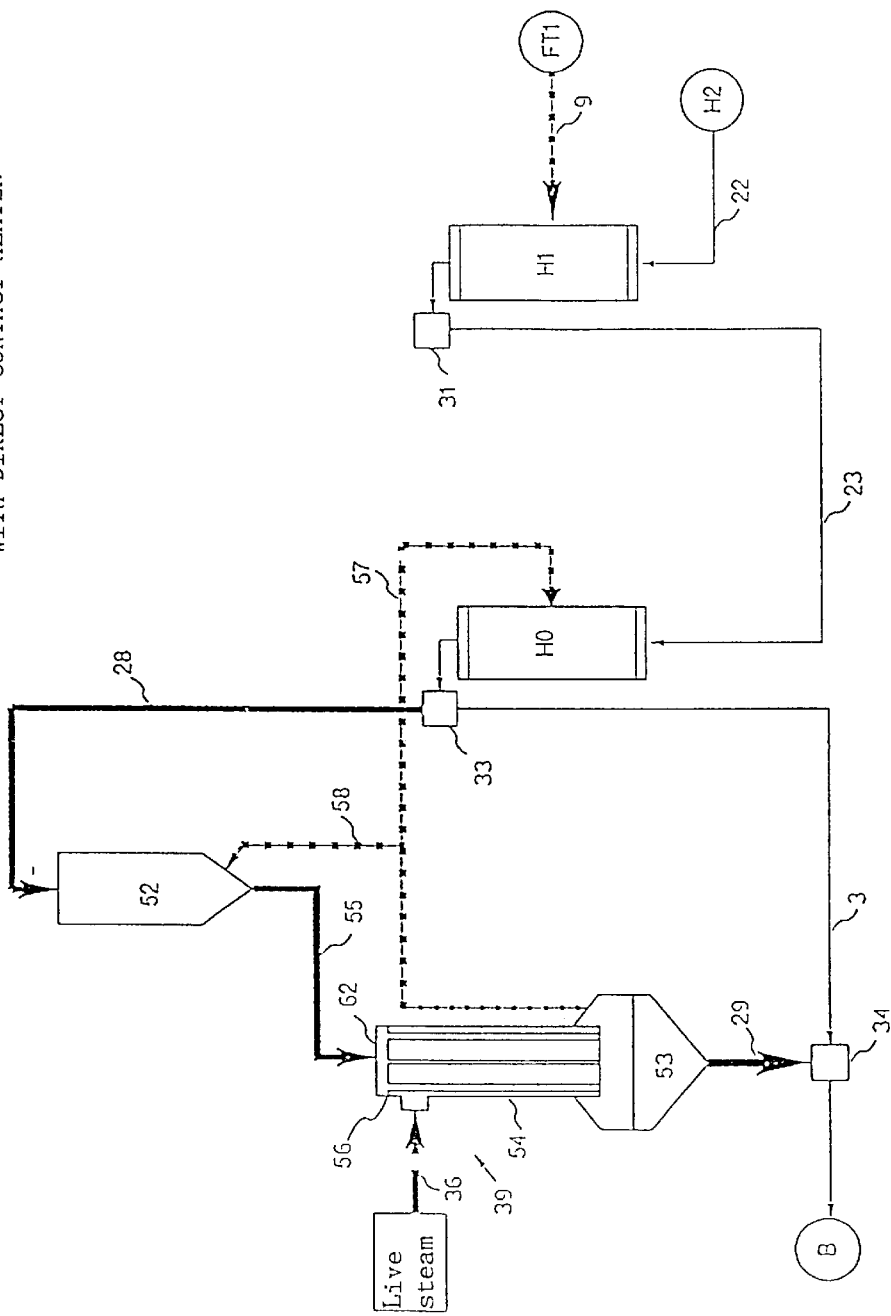
FIG. 9 shows in detail the single stage simultaneous heating and evaporation phase (one effect) including preferentially upstream, a direct contact heating zone for the aqueous medium intended for bauxite digestion by means of the vapour generated by the said simultaneous heating and evaporation phase.

FIG. 9, specific to the invention, shows another version of FIG. 8. According to this figure, the simultaneous heating and evaporation section FFES includes one single stage 39 (single effect). This stage is inserted between heater $H_0$ and mixing zone (B). The simultaneous heating and evaporation stage 39 includes a simultaneous heater-evaporator which operates according to the falling film principle and an associated heater-mixer 52 operates according to the direct contact principle. This type of simultaneous heater-evaporator and its associated direct contact heater is described in patent FR-A-361524 and is taken up again in patent FR-A-1419663 (or also in the publication: "LIGHT METAL 1994, Proceedings of the technical sessions presented by the T.M.S. Light Metal Committee at the 123 Rd-TMS Annual Meeting, San Francisco", entitled: "Evaporation techniques in the alumina industry").

Thus simultaneous heating and evaporation stage 39 includes a direct contact heater 52 and a simultaneous heater-evaporator 54. The spent liquor coming from heater $H_0$ enters the upper part of direct contact heater 52 via line 28. Vapour generated by the simultaneous heater-evaporator 54 (by evaporation of the spent liquor) is thus, at least partly, injected directly into the direct contact heater 52 via line 58, while the other part of this vapour goes via line 57 to feed heater $H_0$. The spent liquor which is heated by the direct contact heater 52 to its boiling point is then fed via line 55 to simultaneous heater-evaporator 54.

For the remainder of the description, FIG. 9 complies with FIG. 6.

Figure 10:
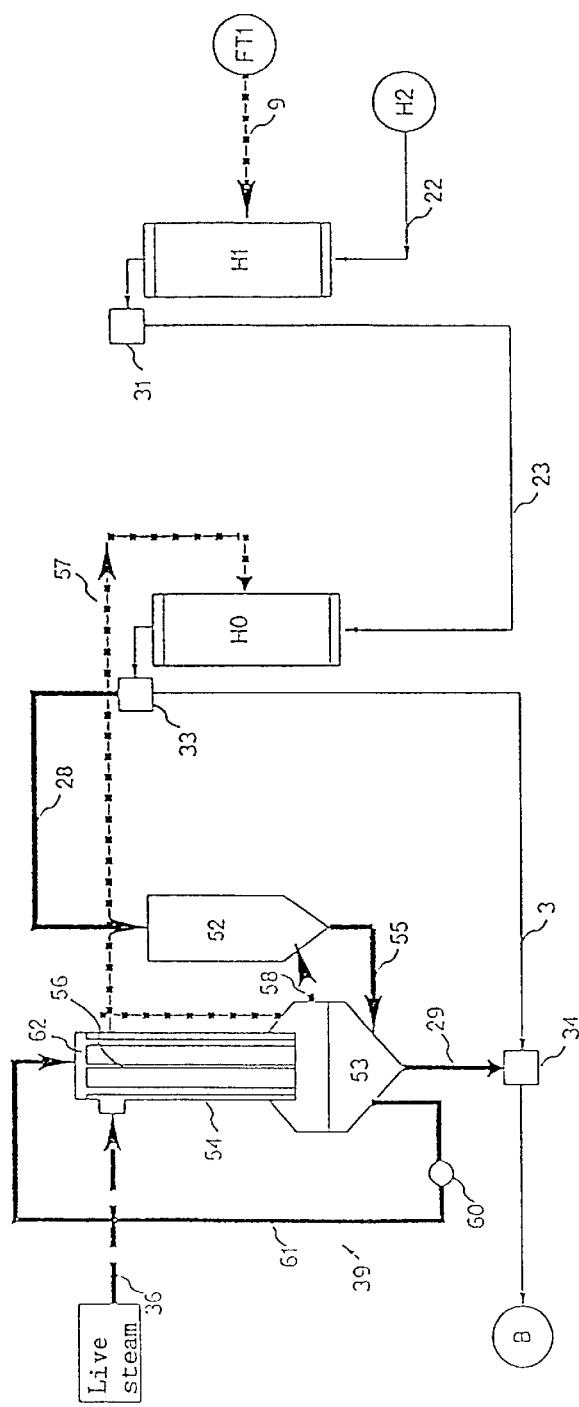
FIG. 10 shows a version of FIG. 9 including a recirculation (by pump) of the aqueous medium intended for use in digestion through the simultaneous heating and evaporation phase in accordance with example 1.

FIG. 10, specific to the invention, is also another version of FIGS. 6 and 8. According to this figure, the simultaneous heating and evaporation section FFES includes a stage 39. This stage is inserted between heaters $H_0$ and mixing zone (B). The simultaneous heating and evaporation stage 39 used includes a simultaneous heater-evaporator which operates according to the falling film principle and preferentially a heater-mixer (52) is associated with it upstream, operating according to the liquid-vapour direct contact principle.

The spent liquor coming from heater $H_0$ enters the upper part of the direct contact heater 52 via line 28. Vapour generated by simultaneous heater-evaporator 54 (by evaporation of the attack liquor) is thus, at least partly, injected directly into the direct contact heater via line 58, while the other part of this vapour goes via line 57 to feed heater $H_0$. The temperature of the spent liquor is thus raised to boiling point by the direct contact heater 52 and then flows via line 55 into simultaneous heater-evaporator 54.

The simultaneous heater-evaporator 54 includes a vertical tubular surface heat exchanger 56 and a liquid-vapour separator 53. Unlike FIGS. 8 and 9, the decomposed liquor is recycled by means of pump 60 (which ensure a constant flow) from separator 53, it flows through line 61 and enters vertical tubular exchanger 56 via a distribution system 62. Exchanger 56 has long vertical tubes as previously indicated. The mixture of spent liquor and vapour falls down the length of the tubes, concentrates by evaporation and leaves the bottom of the tubes then returns to the liquid-vapour separator 53. The vapour coming from liquid-vapour separation is used to feed the direct contact heater 52 via line 58 and tubular heater $H_0$ via line 57. The heating zone of exchanger 54 is fed with live steam coming from the live steam production unit LS via line 36.

The bottom of the liquid-vapour separator 53 is equipped with a connection 29 which sends the attack liquor brought up to its optimum temperature and concentration to the mixing zone B.

Figure 11:
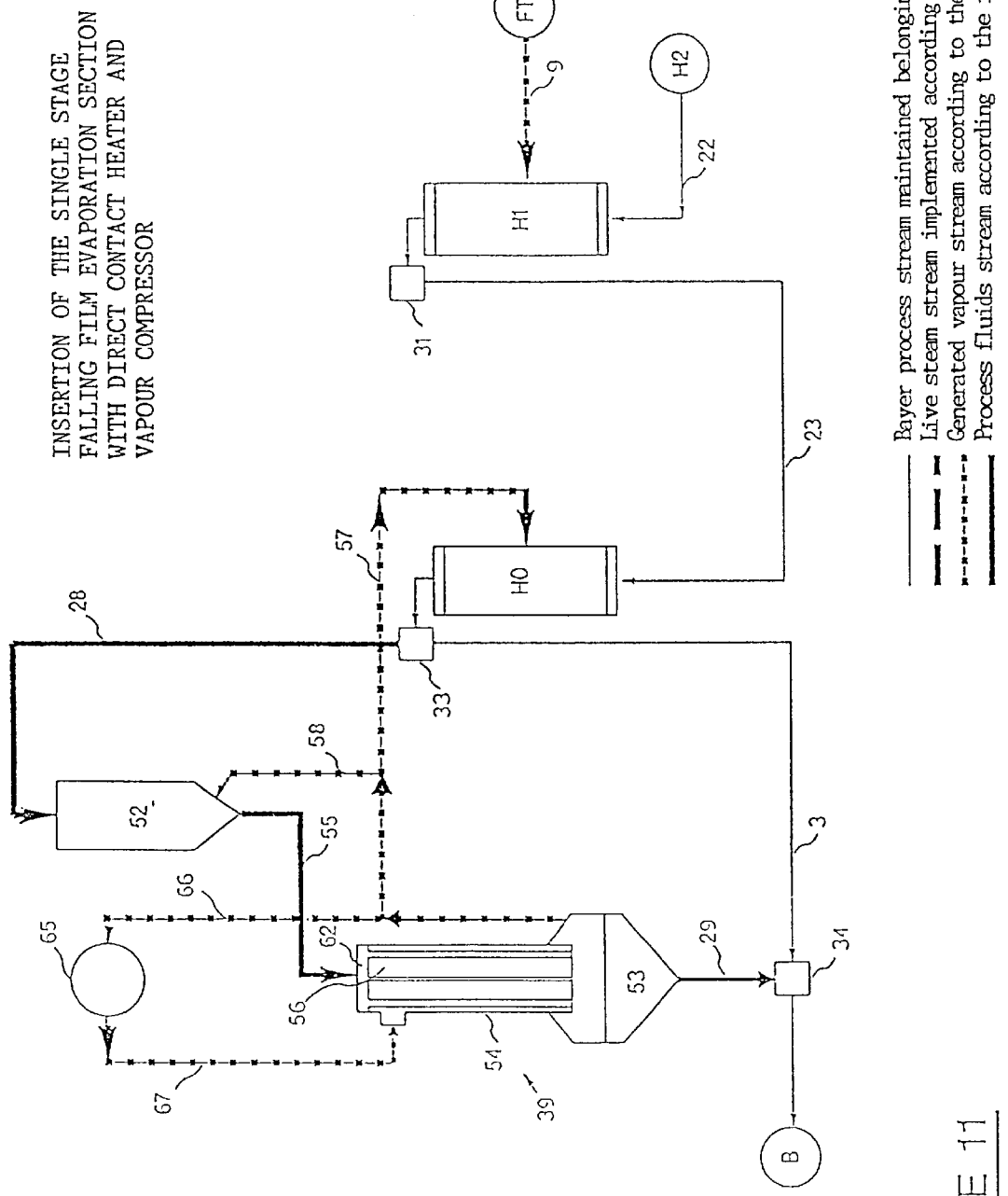
FIG. 11 shows a version of FIG. 9 including a compressor for the vapour generated by the simultaneous heating and evaporation phase.

FIG. 11, specific to the invention, is also another version of FIGS. 8, 9 and 10 in which the simultaneous heating and evaporation section FFES is equipped with a compression station 65 for the vapour generated by the simultaneous heating and evaporation stage 39, which is used to compress the vapour coming from separator 53 to the operating pressure of exchanger 54. This compression station is fed by line 66 which takes up part of the vapour coming from liquid-vapour separator 53. On the outlet of the compressor, the vapour compressed to the required pressure is sent via line 67 and used to heat exchanger 56.

Figure 12:
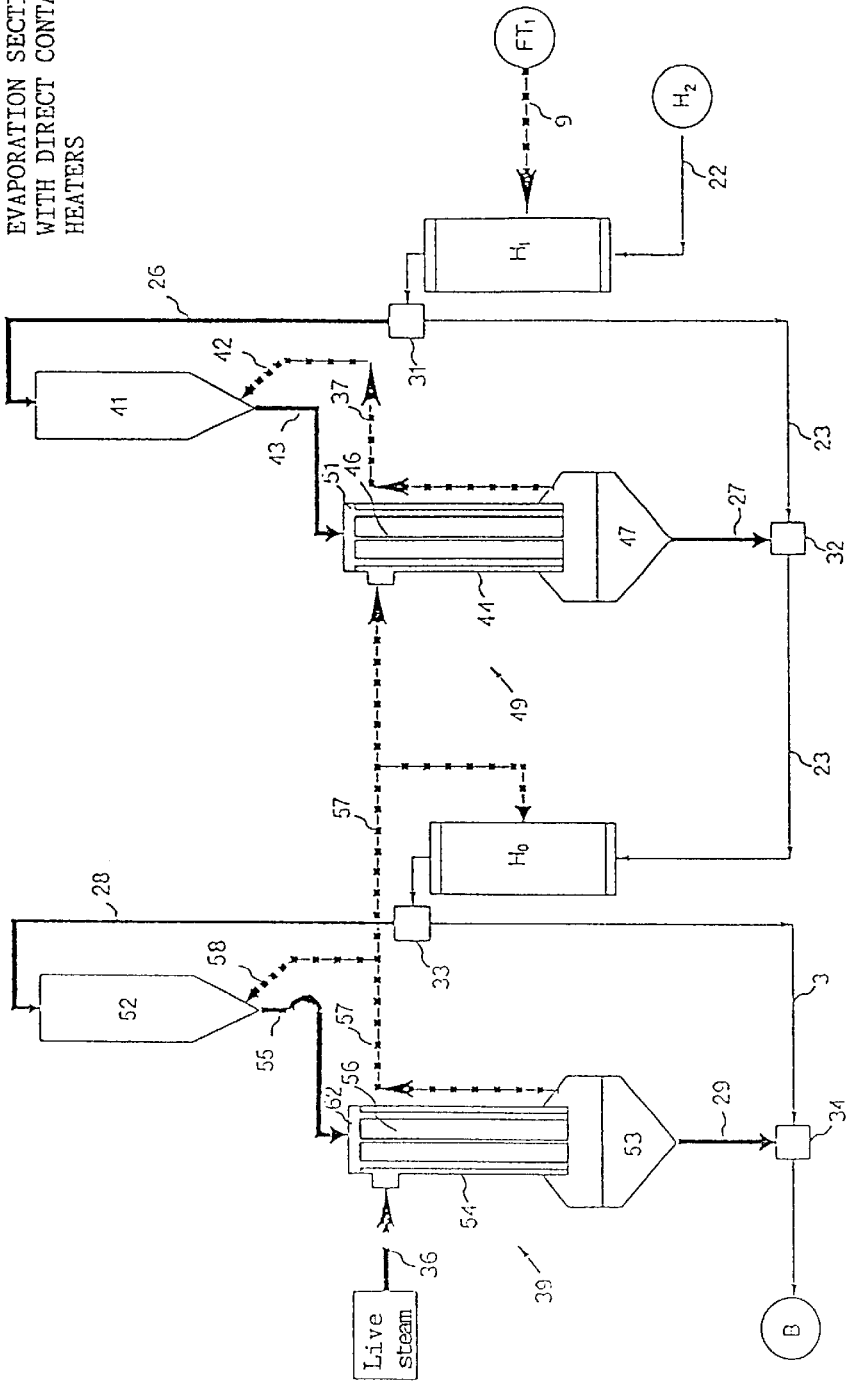
FIG. 12 shows in detail the double stage simultaneous heating and evaporation phase (double effect) according to the invention, included in FIG. 4.
Figure 13:
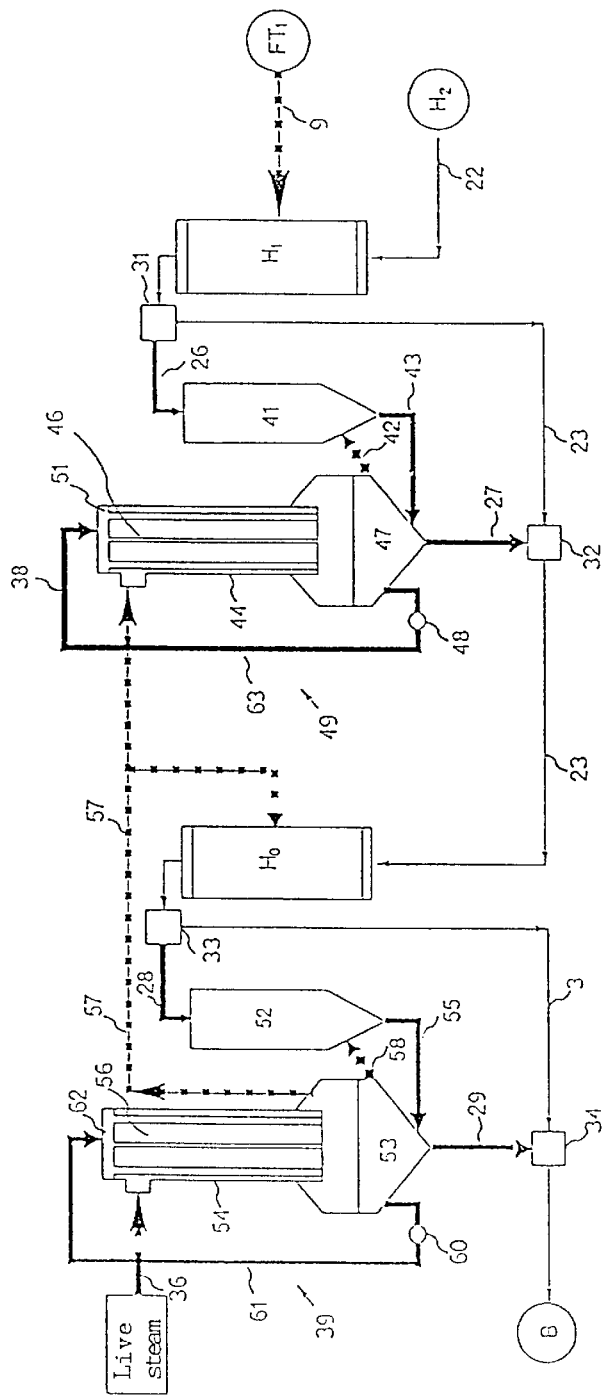
FIG. 13 shows a version of FIG. 12 including recirculation of the aqueous medium for bauxite digestion by pump in each stage of the simultaneous heating and evaporation phase and complying with example 2.

According to FIGS. 12 and 13 which illustrate the invention, the simultaneous heating and evaporation section FFES includes two stages 39 and 49 (double effect). One of the stages 49 is inserted between heaters $H_1$ and $H_0$. The other stage 39 is placed between heater $H_0$ and the mixing zone B. The simultaneous heating and evaporation stages 39 and 49 used each include a simultaneous heater-evaporator which operates according to the falling film principle and an associated heater-mixer operating according to the liquid-vapour direct contact principle.

The simultaneous heating and evaporation stage 49 includes a direct contact heater 41 and a simultaneous heater-evaporator 44. The spent liquor coming from heater $H_1$ enters the upper part of direct contact heater 41 via line 26. Vapour generated by simultaneous heater-evaporator 44 (by evaporation of the spent liquor) is injected directly into the direct contact heater 41 via line 42. The temperature of the spent liquor is thus raised to its boiling point by the direct contact heater 41 and thereafter flows via line 43 into the simultaneous heater-evaporator 44.

The simultaneous heater-evaporator 44 includes a vertical tubular surface heat exchanger 46 and a liquid-vapour separator 47. The exchanger 46 is equipped with a large number of vertical tubes with the previously indicated characteristics. The mixture of spent liquor and vapour falls down the length of the tube walls, its concentrates and leaves the bottom of the tubes via the liquid-vapour separator 47. The vapour coming from liquid-vapour separation goes via line 42 to feed the direct contact heater 41. The heating zone of the exchanger 46 is fed with vapour from the simultaneous heating and evaporation unit 39 via line 57.

The bottom of the liquid-vapour separator 47 is equipped with connection 27 which sends the spent liquor during regeneration to tubular heater $H_0$. The liquor leaving heater $H_0$ then enters the other simultaneous heating and evaporation stage 39 via line 28. Similarly to stage 49, this stage 39 includes a direct contact heater 52 coupled up to a simultaneous heater-evaporator 54. The simultaneous heater-evaporator 54, fed with live steam via line 36, includes a liquid-vapour separator 53 and a vertical tube falling film exchanger 56.

Similarly, the vapour produced by evaporation in the simultaneous heater-evaporator 54 is separated and, partly, injected directly into direct contact heater 52 via line 58. The other part of this vapour flows via line 57 and is used to heat the vertical tubular exchanger 46 upstream in the simultaneous heating and evaporation unit 49 and tubular exchanger $H_0$.

The liquor, heated and concentrated to optimum levels for digestion, makes up the attack liquor which leaves the simultaneous heating and evaporation section FFES via line 29. After having undergone the recycling process according to the invention, this liquor ready for digestion can return to the mixing stage B then to digestion D of the bauxite and thus start a new cycle.

In FIG. 13, the spent liquor is recycled by means of pump 48 which ensures a constant flow from separator 47, it goes via line 63 to the upper part of exchanger 46 equipped with a distribution system 51.

Figure 14:
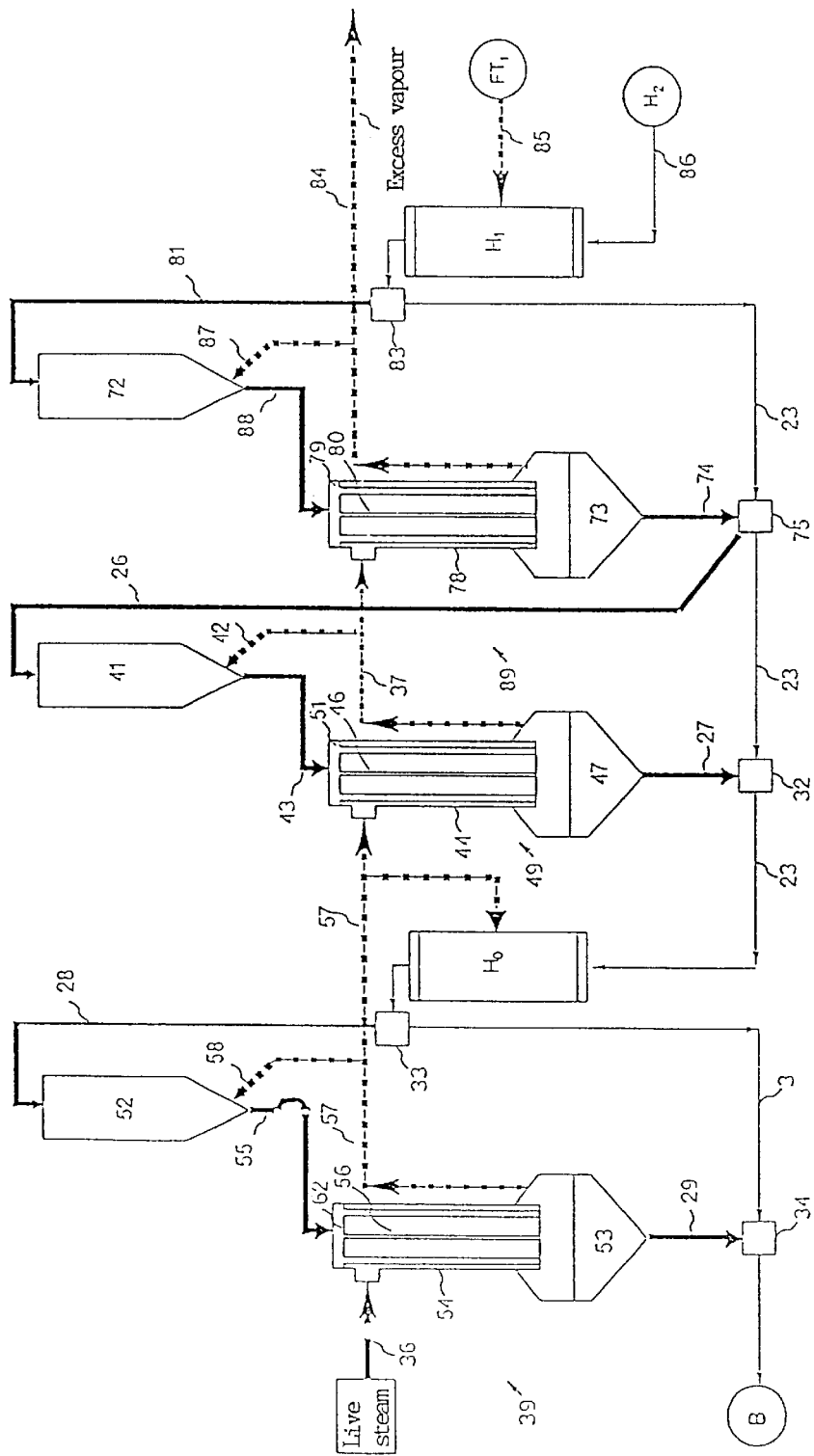
FIG. 14 shows in detail the three stage simultaneous heating and evaporation phase (triple effect).
Figure 15:
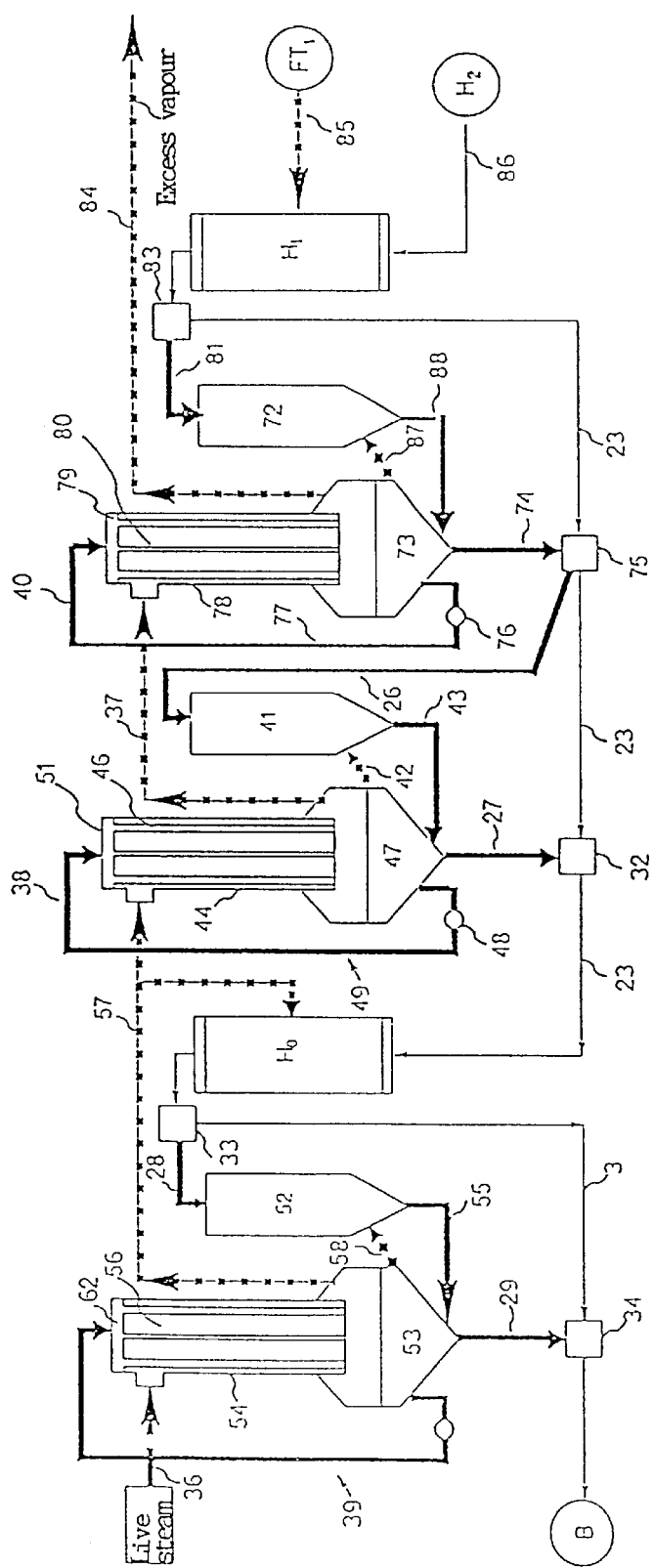
FIG. 15 shows a version of FIG. 14 including including recirculation of the aqueous medium for bauxite digestion by pump in each evaporator of the simultaneous heating and evaporation phase and complying with example 3.

In FIGS. 14 and 15 which illustrate the invention, a new three stage (triple effect) simultaneous heating and evaporation section FFES for the aqueous medium used in digestion is inserted in the Bayer process digestion unit.

In accordance with the indications given previously for the cases described for FIGS. 12 and 13, a simultaneous heating and evaporation stage 39 fed with live steam is inserted between heater $H_0$ and the mixing zone B. The other two stages 49 and 89, installed in line, are inserted between heater $H_1$ (fed with flash vapour from $FT_1$,) and heater $H_0$ (fed with flash vapour from stage 39).

Each simultaneous heating and evaporation stage (39, 49, 89) includes a simultaneous heater-evaporator which operates according to the falling film principle and an associated heater-mixer (52, 41, 72) operating according to the liquid-vapour direct contact principle (all the means have been described for previous cases).

The first stage 39 of the simultaneous heating and evaporation stage according to the invention is fed with live steam via line 36. The vapour it produces itself is sent, partly, to heater-mixer 52 and the other part to heater-evaporator 44 (of the second stage 49) via line 57 and to the tubular heater $H_0$.

The second stage 49 of the said FFES section according to the invention, fed with vapour from the first stage, generates vapour itself which is sent, partly, to its heater-mixer 41 via line 42 and the other part is sent to heater-evaporator 78 (of the third stage 89) via line 37.

The third stage 89 of the said FFES section according to the invention, fed with vapour by the second stage, also generates vapour which is sent, partly, to its heater-mixer 72 via line 87 and, the other part is sent via line 84 to at least one of the zones where vapour is consumed, as indicated previously.

The spent liquor leaving $H_1$ is fed by line 81 to heater-mixer 72 in which it is heated by vapour coming from line 87. Thus heated, this liquor leaving heater-mixer 72 via line 88, enters simultaneous heater-evaporator 78 in which it circulates (FIG. 15) via pump 75 and line 77 and where it concentrates by evaporation-separation (79, 80, 73) and leaves via line 74 and thereafter successively feeds stages 2 and 1 in order, as described for the previous cases.

At the end of the cycle, the liquor, which has been heated and concentrated in the three stages of the simultaneous heating and evaporation section according to the invention, makes up the bauxite attack liquor, having the temperature and concentration parameters initially set by the User of the Bayer process.

Generally speaking, the installation of the simultaneous heating and evaporation section according to the invention in the Bayer process alumina production cycle presents the significant advantage, thanks to the presence of valves such as 75, 31, 32, 33, 34 which are located at the interconnection of lines 23 and 74, 23 and 26, 23 and 27, 3 and 28, 3 and 29 respectively, of enabling the disconnection of one or other of the stages of the simultaneous heating and evaporation section FFES of the recycling line C and to revert to the usual heating mode, for example during a cleaning cycle.

Consequently, there is no necessity to invest in a stand-by simultaneous heater-evaporator as is usually the case for tubular heaters.

OPERATION OF THE UNIT ACCORDING TO THE INVENTION

The process according to the invention allows all the disadvantages of the previous art to be completely avoided by modifying the system of exchange between the evaporation vapour and the aqueous medium intended for use in digestion (spent liquor transformed into attack liquor), which must be heated and reconcentrated in active caustic soda. This aqueous medium, according to FIG. 13 for example, is fed via line 26 to direct contact heater 41, where it is heated by part of the evaporation vapour taken from liquid-vapour separator 47. The aqueous medium is no longer heated indirectly via the walls of a heat exchanger, but by direct injection of vapour from the simultaneous heater-evaporator 44 into direct contact heater 41 without any heat exchange surface intervening. The aqueous medium to be evaporated is heated to its boiling point before it is fed to the tubular exchanger 46. The effect of this heating is significant and brings about the increased thermal efficiency of the heat exchange surface of the evaporator-heaters.

The aqueous medium (to be used for digestion), thus heated, can then be fed through vessel 47, then, by recycling, through the tubular exchanger 46 of a simultaneous heater-evaporator. As this operation is carried out continuously, the level in vessel 47 is kept constant by the simultaneous routing of aqueous medium to the first stage of simultaneous heating and evaporation and to the tubular exchanger 46 of simultaneous heater-evaporator 44, regardless of the load of the latter.

In theory, any type of simultaneous heater-evaporator can be used but in practice a falling film type simultaneous heater-evaporator is preferably used. In the latter type of heater-evaporator, the water in the aqueous medium vaporises in the exchanger tubes as soon as the medium enters the said tubes. The vapour generated entrains the aqueous medium at increasing velocities forming a film on the inside wall of the tubes of the exchanger. Distribution system 51 operates in such a way that a practically constant flow of fluid is fed to each tube. The design of the simultaneous heater-evaporator is such that the film is sufficiently thin to obtain a good heat exchange coefficient and sufficiently thick to avoid the falling film drying up. The heated and concentrated recycled aqueous medium flows to vessel 47 which plays the role of liquid-vapour separator.

The vapour thus produced is put into contact with the spent liquor coming from the previous stage $H_1$ in direct contact heater 41. The simultaneous heater-evaporator operates with evaporation vapour if it is an intermediate stage, or with live steam coming from a generator, if it is a first stage. The particularity of the falling film heater-evaporator is that the heat required to heat and/or evaporate the liquor is transferred by one single apparatus. Thus the concentration of the aqueous medium is achieved in the stage under consideration. The vapour produced is sent to the evaporator of the previous stage to allow the heater-evaporator of this stage to play its role fully. This consequently provides a multiple effect heater-evaporator in which the concentration of the recycled aqueous medium increases from stage to stage.

Thanks to this principle, a significantly greater additional evaporation may be achieved as compared with existing capacities, especially if it is taken into account that the evaporation capacity of digestion is fixed. Furthermore, the heat transfer coefficient of a simultaneous heater-evaporator, in particular falling film type, is very high (about twice that of tubular heaters). This particularity further heightens the economic significance of the invention.

The process and the recycling line according to the invention are not restricted by details of modes of implementation or by the examples chosen to illustrate them. Modifications may be made without going beyond the scope of the invention. The latter consequently includes all the means which make up technical equivalents of the means described, as well as their combination.

COMPARATIVE EXAMPLES OF IMPLEMENTATION

Comparative Example No. 1

Complying with FIGS. 6 and 8

According to the status of the technique, a conventional alumina production plant not equipped with a specific evaporation section (P) according to FIG. 3, with a capacity of 500,000 t/year according to the previous art (table 1, column 1) includes:
- a flash-evaporation section in stages FT, interconnected, installed in series in which circulates the aqueous medium coming from digestion;
- a section of heaters (H), interconnected, installed in series and in which circulates the spent liquor (aqueous medium intended for use in digestion) counter-current to the aqueous medium coming from digestion, each flash tank (FT) being connected for vapour circulation with a directly corresponding heater (H);
- a heater $H_0$ connected to a source of live steam (LS), connected to the inlet of mixer (B) [to ensure the circulation of the aqueous medium intended for use in digestion coming from the outlet of heater $H_1$ of the series of heaters (H)]

The spent liquor (coming from the precipitation of $Al(OH)_3$) has:
- a flowrate of about 1460 t/hr at the outlet of H,
- a concentration of about 130 g/l active $Na_2O$ at the inlet of $H_1$,
- a temperature of about 120° C. at the outlet of $H_1$,
- a temperature of about 156° C. at the outlet of $H_0$,
- finally, a concentration of about 130 g/l active $Na_2O$ at the outlet of $H_0$.

To raise the temperature of the spent liquor from 120° C. (at the outlet of $H_1$) to 156° C. (at the outlet of $H_0$), so that the attack liquor (made up of the mixture of the said liquor with the heated bauxite) reaches the temperature level required for bauxite digestion (about 145° C.), the evaporation capacity of the staged flashing zone is 86.3 t/hr and it consumes 91.9 t/hr of live steam for the operation of the plant.

Figure 2:
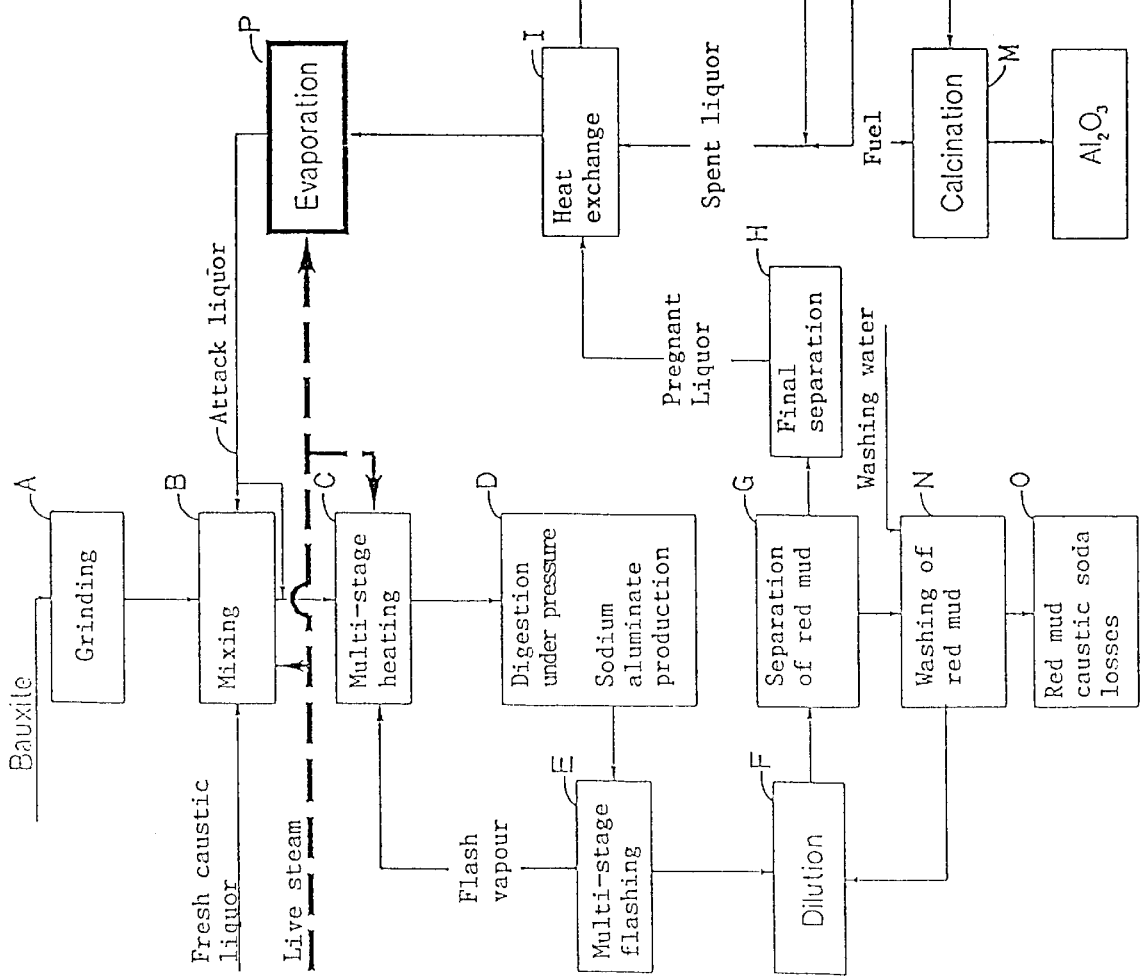

In the same conventional alumina production unit, but equipped with a specific evaporation section (P) (according to FIGS. 2 and 3), having a capacity of 500,000 t/year complying with the previous art (table 1, column 2), and the previously mentioned conditions, the temperature rise of the spent liquor from 120° C. (at the outlet of $H_1$) to 156° C. (at the outlet of $H_0$), for the attack medium, made up of the mixture of the said liquor and the heated bauxite, to be at the required temperature for the digestion of this bauxite (about 145° C.), the total evaporation capacity of the plant is still 86.3 t/hr and it consumes 91.9 t/hr of live steam for the operation of the said plant.

The Bayer process industrial plant is therefore set to operate at a concentration of 136 g/l active $Na_2O$ in the spent liquor instead of 130 g/l, at the outlet of the heating section (table 1, column 3, line 6).

According to the status of the technique, to increase the active $Na_2O$ concentration in the spent liquor from 130 g/l to 136 g/l (table 1, column 2) in this same plant according to the previous art, while maintaining the temperature of the liquor at the outlet of $H_0$ at 156° C., the total evaporation capacity of the plant must be increased from 86.3 t/hr to 141.9 t/hr (line 9), which would require an increase of 55.6 t/hr in evaporation capacity in the plant (column 3, line 10).

To achieve the set objective, and accelerate bauxite digestion [in the plant according to the status of the technique, equipped with a specific evaporation section (P)] (table 1, column 4), the total evaporation capacity required in the plant must be increased from 86.3 t/hr to 141.9 t/hr. The evaporation capacity of the specific evaporation section (P) must therefore be raised by 55.6 t/hr. Consequently, the total live steam consumption in the plant increases by 17 t/hr resulting in a consumption of 108.9 t/hr instead of 91.9 t/hr.

Thus, in a Bayer process plant set up according to the status of the technique, an increase of 6 g/l in the active $Na_2O$ concentration of the attack liquor, brings about an increase of 7 t/hr in the live steam consumption, which renders the said increase in concentration of the spent liquor (or liquor intended for use in digestion) economical undesirable.

According to the invention, the previously mentioned industrial unit was equipped with the single stage spent liquor simultaneous heating and evaporation section (FFES). The comparison of figures between the previous art (table 1, column 4) and the subject of this invention (table 1, column 5) shows that, by implementing the simultaneous heater-evaporator (FFES), the spent liquor temperature being raised from 120 to 156° C. ($H_0$ outlet), it was possible to reach the set objective, that is to say, an increase in the concentration of active $Na_2O$ from 130 to 140 g/l in the spent liquor. To achieve this, the total evaporation capacity of the flashing zone (E) (line 7) was raised from 86.6 t/hr to 141.9 t/hr, which represents an increase in total evaporation capacity of 55.6 t/hr as compared with the previous art (columns 1 and 2) for an increased steam consumption of 0.5 t/hr (92.5 t/hr against 91.9 t/hr) (line 13, columns 1, 2, 4 and 5).

Thus, by means of the invention, with an additional live steam consumption of 0.5 t/hr as compared with the status of the technique, the evaporation capacity of the plant is increased by 55.6 t/hr. Consequently, the set objective of increasing the active $Na_2O$ concentration in the spent liquor intended for attack is reached with a very slight rise in the live steam consumption (0.5 t/hr), whereas the same plant, not equipped with the invention, could only reach this objective with an additional live steam consumption of 17 t/hr.

The integration in the heating section of an alumina production unit (according to the previous art) of a simultaneous heating and evaporation section according to the invention. allows the simultaneous adjustment of active $Na_2O$ in the spent liquor intended for use in digestion, and the liquor temperature to the right level for alumina production and, consequently, considerably improves the overall energy efficiency of the Bayer process with a low investment cost, which can be quickly paid off.

TABLE 1

| | | BAYER PROCESS | | | | |
|---|---|---|---|---|---|---|
| | | Plant operating according to previous art | | | Solution to achieve set objective | |
| | | present status (1) | present status (2) | | | |
| Line | | without specific evaporation section P | with specific evaporation section P | Objective set for process operation (3) | according to previous art (4) | according to the invention with 1 stage (5) |
| 1 | Annual production of $Al_2O_3$ (t/hr) | 500000 | 500000 | 500000 | 500000 | 500000 |
| 2 | Spent liquor flow - outlet $H_1$ (t/hr) | 1460 | 1460 | 1460 | 1460 | 1460 |
| 3 | Concentration of active $Na_2O$ (in g/l) in spent liquor - inlet $H_1$ | 130 | 130 | 130 | 130 | 130 |
| 4 | Liquor temperature - outlet $H_1$ (° C.) | 120 | 120 | 120 | 120 | 120 |
| 5 | Liquor temperature - oulet heating section ($H_1$ or FFES) (° C.) | 156 | 156 | 156 | 156 | 156 |
| 6 | $Na_2O$ concentration in spent liquor (in g/l) - outlet of heating section | 130 | 130 | 136 | 136 | 136 |
| 7 | Evaporation capacity (in t/hr) of the staged flashing zone (E)(*) | 86.3 | 86.3 | — | 86.3 | 141.9 |
| 8 | Evaporation capacity (in t/hr) of the evaporation zone (P) heated with live steam | 0 | 0(**) | — | 55.6 (in P) | 0 |
| 9 | Total evaporation capacity of the plant (E) + (P) (in t/hr) | 86.3 | 86.3 | 141.9 | 141.9 | 141.9 |
| 10 | Increase in total evaporation capacity of the plant (in t/hr) | 0 | 0 | 55.6 | — | 55.6 |
| 11 | Live steam consumption in zone (E) (in t/hr) | 91.9 | 91.9 | — | 91.9 | 92.4 |
| 12 | Live steam consumption in zone (P) (in t/hr) | 0 | 0 | — | 17 | 0 |
| 13 | Total live steam consumption in (E) + (P) (in t/hr) | 91.9 | 91.9 | — | 108.9 | 92.4 |

(*)The evaporation capacity of zone E is calculated to account for the flashing of the pregnant liquor from 145° C. to 107.3° C. (atmospheric pressure)
(**)The hypothesis is made to simplify the explanation that the evaporation section (P) has a capacity of zero before setting the objective of increasing the active $Na_2O$ concentration in the spent liquor by 6 g/l Comparative Example No. 2

Complying with FIGS. 4 and 13

Figure 1:
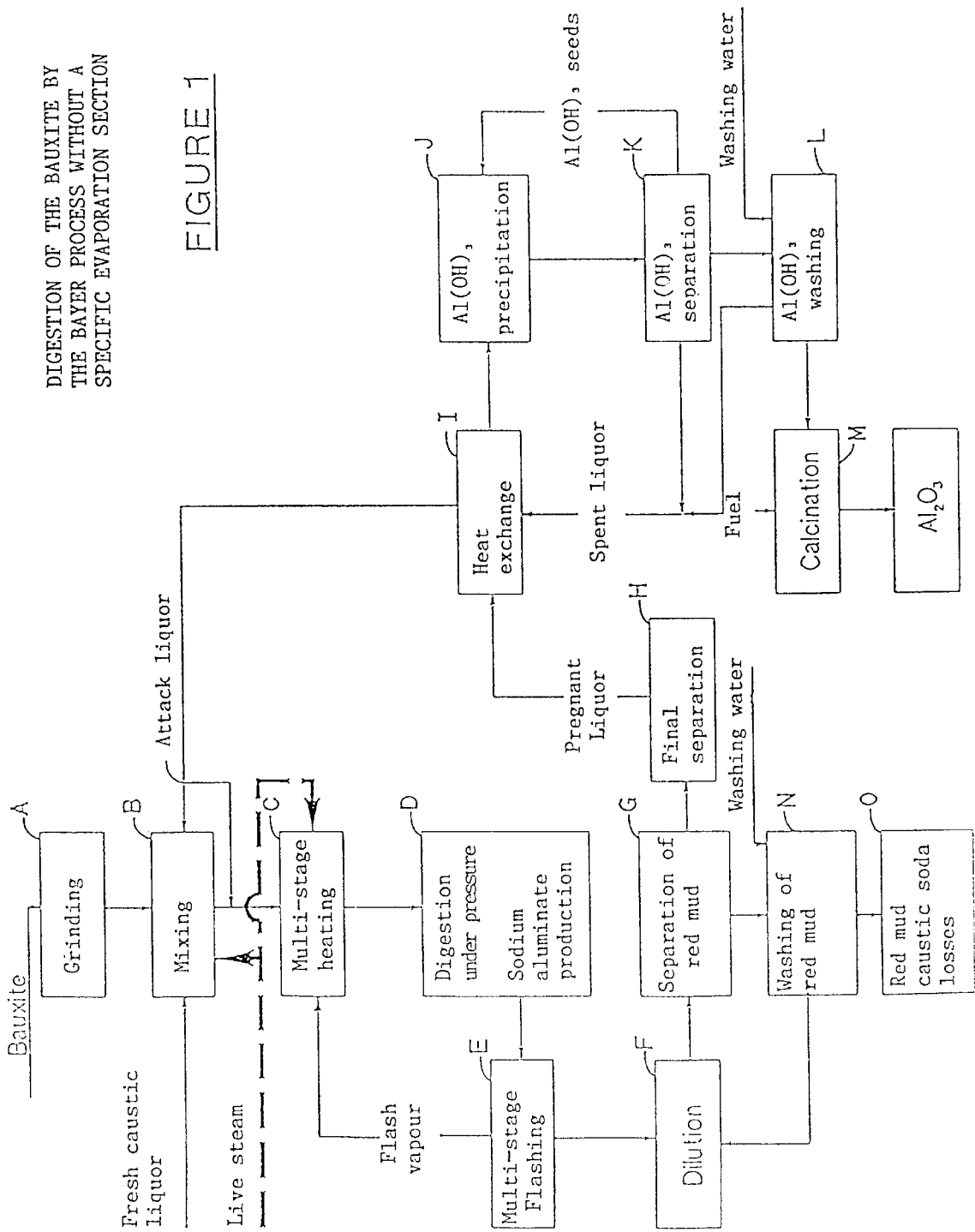

According to the status of the technique, a conventional alumina production plant not equipped with a specific evaporation section (P) according to FIGS. 1 and 3, with a capacity of 500,000 t/year according to the previous art (table 2, column 1) includes:

a flash-evaporation section in stages FT, interconnected, installed in series in which circulates the aqueous medium coming from digestion;

a section of heaters (H), interconnected, installed in series and in which circulates the spent liquor (aqueous medium intended for use in digestion) counter-current to the aqueous medium coming from digestion, each flash tank (FT) being connected for vapour circulation with a directly corresponding heater (H);

a heater $H_0$ connected to a source of live steam (LS), and also to the inlet of mixer (M) [to ensure the circulation of the aqueous medium intended for use in digestion coming from the outlet of heater $H_1$ of the series of heaters (H)];

The spent liquor (coming from the precipitation of $Al(OH)_3$) has:

a flowrate of about 1460 t/hr at the outlet of H, a concentration of about 130 g/l active $Na_2O$ at the inlet of $H_1$, a temperature of about 120° C. at the outlet of $H_1$, a temperature of about 156° C. at the outlet of $H_0$, finally, a concentration of about 130 g/l active $Na_2O$ at the outlet of $H_0$ To raise the temperature of the spent liquor from 120° C. (at the outlet of $H_1$) to 156° C. (at the outlet of $H_0$), so that the attack liquor (made up of the mixture of the said liquor with the heated bauxite) reaches the temperature level required for bauxite digestion (about 145° C.), the evaporation capacity of the staged flashing zone is 86.3 t/hr and it consumes 91.9 t/hr of live steam for the operation of the plant.

In the same conventional alumina production unit, but equipped with a specific evaporation section (P) (according to FIGS. 2 and 3), having a capacity of 500,000 t/year complying with the previous art (table 2, column 2), and the previously mentioned conditions, the temperature rise of the spent liquor from 120° C. (at the outlet of $H_1$) to 156° C. (at the outlet of $H_0$), for the attack medium, made up of the mixture of the said liquor and the heated bauxite, to be at the required temperature for the digestion of this bauxite (about 145° C.), the total evaporation capacity of the plant is still 86.3 t/hr and it consumes 91.9 t/hr of live steam for the operation of the said plant.

The Bayer process industrial plant is therefore set to operate at a concentration of 140 g/l active $Na_2O$ in the spent liquor instead of 130 g/l, at the outlet of the heating section (table 2, column 3, line 6).

In this same plant according to the previous art, to increase the active $Na_2O$ concentration in the spent liquor from 130 g/l to 140 g/l (table 2, column 2) while maintaining the temperature of the liquor at the outlet of $H_0$ at 156° C., the total evaporation capacity of the plant must be increased from 86.3 t/hr to 170.3 t/hr (line 9), which requires an increase of 84 t/hr total evaporation capacity in the plant (column 3, line 10).

To achieve the set objective, that is to say to increase the concentration of active $Na_2O$ in the spent liquor from 130 g/l to 140 g/l to accelerate bauxite digestion [in the plant according to the status of the technique, equipped with a specific evaporation section (P)] (table 2, column 4), the total evaporation capacity required in the plant must be increased from 86.3 t/hr to 170.3 t/hr. The evaporation capacity of the specific evaporation section (P) must therefore be raised by 84 t/hr. Consequently, the total live steam consumption in the plant increases by 28 t/hr resulting in a consumption of 119.9 t/hr instead of 91.9 t/hr.

Thus, in a Bayer process bauxite digestion plant, an increase of 10 g/l in the active $Na_2O$ concentration of the attack liquor, brings about an increase of 28 t/hr in the live steam consumption, which renders the said increase in concentration of the spent liquor (or liquor intended for use in digestion) economical undesirable.

According to the invention, the previously mentioned industrial unit was equipped with the double stage spent liquor simultaneous heating and evaporation section (FFES).

increasing the active $Na_2O$ concentration in the spent liquor intended for attack is reached with a very slight rise in the live steam consumption (1 t/hr), whereas the same plant, not equipped with the invention, could only reach this objective with an additional live steam consumption of 28 t/hr.

The integration in the heating section of an alumina production unit (according to the previous art) of a simultaneous heating and evaporation section according to the invention, allows the simultaneous adjustment of active $Na_2O$ in the spent liquor intended for use in digestion, and the liquor temperature to the right level for alumina production and, consequently, considerably improves the overall energy efficiency of the Bayer process with a low investment cost, which can be paid off in a short time.

TABLE 2

| | | BAYER PROCESS | | | | |
|---|---|---|---|---|---|---|
| | | Plant operating according to previous art | | | Solution to achieve set objective | |
| | | present status (1) | present status (2) | | | |
| Line | | without specific evaporation section P | with specific evaporation section P | Objective set for process operation (3) | according to previous art | according to the invention with 2 stages |
| 1 | Annual production of $Al_2O_3$ (t/hr) | 500000 | 500000 | 500000 | 500000 | 500000 |
| 2 | Spent liquor flow - outlet $H_1$ (t/hr) | 1460 | 1460 | 1460 | 1460 | 1460 |
| 3 | Concentration of active $Na_2O$ (in g/l) in spent liquor - inlet $H_1$ | 130 | 130 | 130 | 130 | 130 |
| 4 | Liquor temperature - outlet $H_1$ (° C.) | 120 | 120 | 120 | 120 | 120 |
| 5 | Liquor temperature - oulet heating section ($H_1$ or FFES) (° C.) | 156 | 156 | 156 | 156 | 156 |
| 6 | $Na_2O$ concentration in spent liquor (in g/l) - outlet of heating section | 130 | 130 | 140 | 140 | 140 |
| 7 | Evaporation capacity (in t/hr) of the staged flashing zone (E)(*) | 86.3 | 86.3 | — | 86.3 | 170.3 |
| 8 | Evaporation capacity (in t/hr) of the evaporation zone (P) heated with live steam | 0 | 0(**) | — | 84 (in P) | 0 |
| 9 | Total evaporation capacity of the plant (E) + (P) (in t/hr)(*) | 86.3 | 86.3 | 170.3 | 170.3 | 170.3 |
| 10 | Increase in total evaporation capacity of the plant (in t/hr) | 0 | 0 | 84 | — | 84 |
| 11 | Live steam consumption in zone (E) (in t/hr) | 91.9 | 91.9 | — | 91.9 | 92.9 |
| 12 | Live steam consumption in zone (P) (in t/hr) | 0 | 0 | — | 28 | 0 |
| 13 | Total live steam consumption in (E) + (P) (in t/hr) | 91.9 | 91.9 | — | 119.9 | 92.9 |

(*)The evaporation capacity of zone E is calculated to account for the flashing of the pregnant liquor from 145° C. to 107.3° C. (atmospheric pressure)
(**)The hypothesis is made to simplify the explanation that the evaporation section (P) has a capacity of zero before setting the objective of increasing the active $Na_2O$ concentration in the spent liquor by 10 g/l The comparison of figures between the previous art (table 2, column 4) and the subject of this invention (table 2, column 5) shows that, by implementing the simultaneous heater-evaporator (FFES), the spent liquor temperature being raised from 120° C. ($H_1$ outlet) to 156° C. ($H_0$ outlet), it was possible to reach the set objective, that is to say, an increase in the concentration of active $Na_2O$ from 130 to 140 g/l in the spent liquor without a significant rise in the live steam consumption. To achieve this, the total evaporation capacity of the flashing zone E (line 7) was raised from 86.6 t/hr to 170.3 t/hr, which represents an increase in total evaporation capacity of 84 t/hr as compared with the previous art (columns 1 and 2) for an increased steam consumption of only 1 t/hr (92.9 t/hr against 91.9 t/hr) (line 13, columns 1, 2, 4 and 5).

Thus, by means of the invention, with an additional live steam consumption of 1 t/hr as compared with the status of the technique, the evaporation capacity of the plant is increased by 84 t/hr. Consequently, the set objective of Comparative Example No. 3

Complying with FIGS. 4 and 15

According to the status of the technique, a conventional alumina production plant not equipped with a specific evaporation section (P) (according to FIGS. 1 and 3), with a capacity of 500,000 t/year according to the previous art (table 3, column 1) includes:

a flash-evaporation section in stages FT, interconnected, installed in series in which circulates the aqueous medium coming from digestion;

a section of heaters (H), interconnected, installed in series and in which circulates the spent liquor (aqueous medium intended for use in digestion) counter-current to the aqueous medium coming from digestion, each flash tank (FT) being connected for vapour circulation with a directly corresponding heater (H);

a heater $H_0$ connected to a source of live steam (LS), and also to the inlet of mixer (M) [to ensure the circulation of the aqueous medium intended for use in digestion coming from the outlet of heater $H_1$ of the series of heaters (H)]

The spent liquor (coming from the precipitation of Al(OH)$_3$) has:
- a flowrate of about 1460 t/hr at the outlet of H,
- a concentration of about 130 g/l active $Na_2O$ at the inlet of $H_1$,
- a temperature of about 120° C. at the outlet of $H_1$,
- a temperature of about 156° C. at the outlet of $H_0$,
- finally, a concentration of about 130 g/l active $Na_2O$ at the outlet of $H_0$.

To raise the temperature of the spent liquor from 120° C. (at the outlet of $H_1$) to 156° C. (at the outlet of $H_0$), so that the attack liquor (made up of the mixture of the said liquor with the heated bauxite) reaches the temperature level required for bauxite digestion (about 145° C.), the evaporation capacity of the staged flashing zone is 86.3 t/hr and it consumes 91.9 t/hr of live steam for the operation of the plant.

In the same conventional alumina production unit, but equipped with a specific evaporation section (P) (according to FIGS. 2 and 3), having a capacity of 500,000 t/year complying with the previous art (table 3, column 2), and the previously mentioned conditions, the temperature rise of the spent liquor from 120° C. (at the outlet of $H_1$) to 156° C. (at the outlet of $H_0$), for the attack medium, made up of the mixture of the said liquor and the heated bauxite, to be at the required temperature for the digestion of this bauxite (about 145° C.), the total evaporation capacity of the plant is still 86.3 t/hr and it consumes 91.9 t/hr of live steam for the operation of the said plant.

The Bayer process industrial plant is therefore set to operate at a concentration of 145 g/l active $Na_2O$ in the spent liquor instead of 130 g/l, at the outlet of the heating section (table 3, column 3, line 6).

In this same plant according to the previous art, to increase the active $Na_2O$ concentration in the spent liquor from 130 g/l to 145 g/l (table 3, column 2) while maintaining the temperature of the liquor at the outlet of $H_0$ at 156° C., the total evaporation capacity of the plant must be increased from 86.3 t/hr to 211.3 t/hr (line 9), which requires an increase of 125 t/hr total evaporation capacity in the plant (column 3, line 10).

To achieve the set objective, that is to say to accelerate bauxite digestion and increase $Al_2O_3$ productivity[in the plant according to the status of the technique, equipped with a specific evaporation section (P)] (table 3, column 4), the total evaporation capacity required in the plant must be increased from 86.3 t/hr to 211.3 t/hr. The evaporation capacity of the specific evaporation section (P) must therefore be raised by 125 t/hr. Consequently, the total live steam consumption in the plant increases by 42 t/hr resulting in a consumption of 133.9 t/hr instead of 91.9 t/hr.

Thus, in a Bayer process bauxite digestion plant according to the status of the technique, an increase of 15 g/l in the active $Na_2O$ concentration of the attack liquor, brings about an increase of 42 t/hr in the live steam consumption, which renders the said increase in concentration of the spent liquor (or liquor intended for use in digestion) economical undesirable.

According to the invention, the previously mentioned industrial unit was equipped with the triple stage spent liquor simultaneous heating and evaporation section (FFES). The comparison of figures between the previous art (table 3, column 4) and the subject of this invention (table 3, column 5) shows that, by implementing the simultaneous heater-evaporator (FFES) according to the invention, the spent liquor temperature being raised from 120° C. ($H_1$ outlet) to 156° C. ($H_0$ outlet), it was possible to reach the set objective, that is to say, an increase in the concentration of active $Na_2O$ from 130 to 145 g/l in the spent liquor. To achieve this, the total evaporation capacity of the flashing zone E (line 7) was raised from 86.6 t/hr to 211.3 t/hr, which represents an increase in total evaporation capacity of 125 t/hr as compared with the previous art (columns 1 and 2) for an increased steam consumption of 11.4 t/hr. So with almost four time less live steam, it was possible to generate 125 t/hr evaporation while providing about 10 t/hr of steam at 2.4 bar abs., capable of producing savings in live steam in the specific evaporation section (P) representing 20 to 40% of the total live steam initially consumed, depending on the exact configuration of the evaporation section. In this case, the plant equipped in this way provides 10 t/hr of steam (line 10) at 2.4 bar abs. for other applications.

The integration in the heating section of an alumina production unit (according to the previous art) of a simultaneous heating and evaporation section according to the invention, allows the simultaneous adjustment of active $Na_2O$ in the spent liquor intended for use in digestion, and the liquor temperature to the right level for alumina production and, consequently, considerably improves the overall energy efficiency of the Bayer process with a low investment cost, which can be paid off in a short time.

TABLE 3

| | | BAYER PROCESS | | | |
|---|---|---|---|---|---|
| | | Plant operating according to previous art | | | Solution to achieve set objective | |
| | | present status (1) | present status (2) | | | |
| Line | | without specific evaporation section P | with specific evaporation section P | Objective set for process operation (3) | according to previous art | according to the invention with 2 stages |
| 1 | Annual production of $Al_2O_3$ (t/hr) | 500000 | 500000 | 500000 | 500000 | 500000 |
| 2 | Spent liquor flow - outlet $H_1$ (t/hr) | 1460 | 1460 | 1460 | 1460 | 1460 |
| 3 | Concentration of active $Na_2O$ (in g/l) in spent liquor - inlet $H_1$ | 130 | 130 | 130 | 130 | 130 |
| 4 | Liquor temperature - outlet $H_1$ (° C.) | 120 | 120 | 120 | 120 | 120 |
| 5 | Liquor temperature - oulet heating section ($H_1$ or FFES) (° C.) | 156 | 156 | 156 | 156 | 156 |

TABLE 3-continued

| | | BAYER PROCESS | | | |
|---|---|---|---|---|---|
| | | Plant operating according to previous art | | | Solution to achieve set objective |
| | | present status (1) | present status (2) | | |
| Line | | without specific evaporation section P | with specific evaporation section P | Objective set for process operation (3) | according to previous art | according to the invention with 2 stages |
| 6 | $Na_2O$ concentration in spent liquor (in g/l) - outlet of heating section | 130 | 130 | 145 | 145 | 145 |
| 7 | Evaporation capacity (in t/hr) of the staged flashing zone (E)(*) | 86.3 | 86.3 | — | 86.3 | 211.3 |
| 8 | Evaporation capacity (in t/hr) of the evaporation zone (P) heated with live steam | 0 | 0(***) | — | 125 (in P) | 0 |
| 9 | Total evaporation capacity of the plant (E) + (P) (in t/hr)(*) | 86.3 | 86.3 | 211.3 | 211.3 | 211.3 |
| 10 | Increase in total evaporation capacity of the plant (in t/hr) | 0 | 0 | 125 | — | 125 |
| 11 | Live steam consumption in zone (E) (in t/hr) | 91.9 | 91.9 | — | 91.9 | 103.3 10(**) |
| 12 | Live steam consumption in zone (P) (in t/hr) | 0 | 0 | — | 42 | 0 |
| 13 | Total live steam consumption in (E) + (P) (in t/hr) | 91.9 | 91.9 | — | 133.9 | 103.3 |

(*)The evaporation capacity of zone E is calculated to account for the flashing of the pregnant liquor from 145° C. to 107.3° C. (atmospheric pressure)
(**)Steam flow at 2.4 bar abs, useful for other applications in the plant
(***)The hypothesis is made to simplify the explanation that the evaporation section (P) has a capacity of zero before setting the objective of increasing the active $Na_2O$ concentration in the spent liquor by 15 g/l

What is claimed is:

1. A process line for use in a Bayer process installation for the treatment of bauxite wherein a slurry of bauxite ore in an alkaline aqueous medium is digested at temperature and pressure values to dissolve alumina as sodium aluminate and separated into solids and a pregnant liquor stream from which aluminum hydroxide is precipitated leaving aqueous medium, the process line to raise simultaneously the temperature and concentration of the aqueous medium for use in the bauxite ore digestion, including:

a section of interconnected evaporator-flash tanks $FT_1$ to $FT_n$ installed in series and through which circulates an aqueous medium coming from the bauxite ore digestion in a digester D;

a section of interconnected heaters $H_0$, $H_1$ to $H_n$ installed in series through which circulates the aqueous medium for use in the bauxite ore digestion, each evaporator $FT_1$ to $FT_n$ flash tank being connected with each heater $H_1$ to $H_n$ directly associated with each flash tank $FT_1$ to $FT_n$ between the flash tanks and the heaters for obtaining vapor circulation;

an optional specific evaporation section P for eliminating by evaporation a quantity of water, additional to that removed in the evaporator-flash tank $FT_1$ to $FT_n$;

at least one heater $H_0$ connected to a source of live steam installed at the inlet of a mixing device and/or bauxite ore digester by means of the aqueous medium to raise the temperature of the aqueous medium coming from the outlet of the first heater $H_1$ in the heater section $H_0$, $H_1$ to $H_n$ to the temperature required for digestion; and a simultaneous heating and evaporation section for the aqueous medium used in the digestion.

2. A process line according to claim 1 wherein said simultaneous heating and evaporation section is inserted at any point in the heating section of the heaters $H_0$, $H_1$ to $H_n$.

3. A process line according to claim 1 wherein said simultaneous heating and evaporation section is inserted at any point in the heating section of the heaters $H_0$, $H_1$ to $H_n$ of the specific evaporation section P.

4. A process line according to claim 1 wherein said simultaneous heating and evaporation section is inserted simultaneously at any point in the heating section of the heaters $H_0$, $H_1$ to $H_n$ and of the specific evaporation section P.

5. A process line according to claim 1 wherein the simultaneous heating and evaporation section is inserted between heater $H_0$ fed with live steam, in the heating section of the heaters $H_0$, $H_1$ to $H_n$, and from which said simultaneous heating and evaporation section receives the aqueous medium to be treated prior to its use in bauxite ore digestion, and the digestion zone which it feeds with aqueous medium for bauxite ore digestion at the temperature and concentration required for digestion.

6. A process line according to claim 1 wherein the simultaneous heating and evaporation section is inserted between heater $H_0$ fed with live steam in the specific evaporation section P, and from which said simultaneous heating and evaporation section receives the aqueous medium to be treated prior to its use in bauxite ore digestion, and heater $H_n$ of the section of interconnected heaters $H_0$, $H_1$ to $H_n$ fed with flash vapor from the evaporator flash tanks, which it feeds with treated aqueous medium.

7. A process line according to claim 1 wherein the simultaneous heating and evaporation section is inserted between heater $H_1$ fed with flash vapor in the heating section of the heaters $H_0$, $H_1$ to $H_n$ and/or in the heating section of the heaters $H_0$, $H_1$ to the specific evaporation section P and from which said simultaneous heating and evaporation section receives the aqueous medium to be treated prior to its use in bauxite ore digestion, and heater $H_0$ fed with live steam in the heating section of the $H_0$, $H_1$ to $H_n$ and/or in the heating section of the heaters $H_0$, $H_1$ to $H_n$ of the specific evaporation section P, which it feeds with treated aqueous medium.

8. A process line according to claim 1 wherein the simultaneous heating and evaporation section is inserted:

according to a first level, between heater $H_1$ fed with flash vapor $FT_1$ and from where it receives the aqueous medium to be treated, for use in bauxite ore digestion, and heater $H_0$ in the heating section of the heaters $H_0$, $H_1$ to $H_n$ and/or in the heating section of the heaters $H_0$, $H_1$ of the specific evaporation section P fed with live steam, in the heating section of the heaters $H_0$, $H_1$ to $H_n$ and/or in the heating section of the heaters $H_0$, $H_1$ of the specific evaporation section P;

according to a second level, between heater $H_0$ fed with live steam and which receives the aqueous medium at a higher temperature for use in bauxite ore digestion and;

either the bauxite ore digestion zone which it feeds with aqueous medium heated and/or concentrated to the level for bauxite ore digestion;

or, in the case of the specific evaporation section P, the heater $H_n$ to which it feeds the treated aqueous medium.

9. A process line according to claim 1 wherein the simultaneous heating and evaporation section is fed with live steam and produces vapor which is used in situ.

10. A process line according to claim 1 wherein the simultaneous heating and evaporation section is connected for the use of the vapor produced:

to heater $H_0$, combining its live steam feed with all or part of the vapor produced;

and/or to at least one of the heaters $H_1$ to $H_n$ in the heating section and/or the specific evaporation section P;

and/or to one of the effects of the multiple effect of the specific evaporation section P;

and/or to the means for the production of hot water and/or to heat the spent liquor for use in preparing bauxite ore slurry for bauxite ore digestion.

11. A process line according to claim 1 wherein the simultaneous heating and evaporation section includes at least one simultaneous heating and evaporation stage for the aqueous medium, each stage being composed of one said simultaneous heating and evaporation section or several simultaneous heating and evaporation means installed in series or in parallel.

12. A process line according to claim 11 wherein the simultaneous heating and evaporation section includes at least one single stage fed with live steam and connected for treating the vapor produced, to heater $H_0$ combining the live steam feed of said one single stage with all or part of the vapor and/or to the exchanger of said one single stage.

13. A process line according to claim 11 wherein the simultaneous heating and evaporation section includes two simultaneous heating and evaporation stages in which the first stage is connected, to treat the vapor produced, to the second stage and to heater $H_0$.

14. A process line according to claim 13 wherein one of stages in the simultaneous heating and evaporation section is connected upstream to the outlet of heater $H_1$ in the series of heaters H and downstream to the inlet of heater $H_0$ and in that the other stage of the simultaneous heating and evaporation section is connected upstream to the outlet of heater $H_0$ and downstream to the digester D when the simultaneous heating and evaporation section is installed in the section of heaters or from heater $H_n$ when the simultaneous heating and evaporation section is installed in the specific evaporation section P.

15. A process line according to claim 11 wherein the simultaneous heating and evaporation section includes three simultaneous heating and evaporation stages, in which one of the stages is connected to the outlet of heater $H_0$, fed with live steam in the heating and/or evaporating sections, the other stages in series being connected upstream to the outlet heater $H_1$ fed with flash vapor, and downstream to the inlet of heater $H_0$ of the heating and/or evaporating sections.

16. A process line according to claim 11 wherein one stage of the simultaneous heating and evaporation section includes a falling film simultaneous heater-evaporator which in turn includes a vertical tube exchanger, a distribution system to distribute the spent liquor on the vertical tube exchanger and a liquid-vapor separator.

17. A process line according to claim 11 wherein one stage of simultaneous heating and evaporation section also includes a direct contact heater to heat the aqueous medium intended for use in digestion with vapor.

18. In a Bayer process treatment of bauxite where a slurry of bauxite in an alkaline aqueous medium is digested at high temperature and pressure values required to dissolve alumina as sodium aluminate and separated into solids and a pregnant liquor stream from which aluminum hydroxide is precipitated leaving aqueous medium, the improvement for raising simultaneously the temperature and concentration of said alkaline aqueous medium from which aluminum hydroxide has been separated for its use in the further digestion of bauxite, comprising the steps of a) cooling and evaporating the aqueous medium in a section of interconnected flash evaporators $FT_1$ to $FT_n$ installed in series;

b) separating a the sterile impurities residue from the pregnant liquor, precipitating the aluminum hydroxide from the sodium aluminate present in the aqueous medium, separating out the aluminum hydroxide and recovering the remaining aqueous medium for use in the further digestion of bauxite;

c) evaporating a quantity of water in addition to that removed in the flash evaporators $FT_1$ to $FT_n$ in an evaporation section P inserted between the section for the precipitation and separation of aluminum hydroxide from the pregnant liquor and recovery of spent liquor in order to further concentrate the aqueous medium for further digestion of bauxite;

d) heating the aqueous medium in a section of interconnected heaters $H_0$, $H_1$ to $H_n$ installed in series with each flash evaporator $FT_1$ to $FT_n$ directly associated with each heater $H_0$, $H_1$ to $H_n$;

e) using the flash vapor generated in each flash evaporator $FT_1$ to $FT_n$ to concentrate the aqueous medium recovered in step b) and forming the aqueous medium to be used in the digestion of bauxite, in the heaters $H_0$, $H_1$ to $H_n$;

f) utilizing live steam supplied to a heater $H_0$ to raise the temperature of the aqueous medium coming from the heaters to the temperature required for digestion; and g) carrying out a simultaneous heating and evaporation of the aqueous medium for use in the digestion of bauxite in a simultaneous heating and evaporation section.

19. Process according to claim 18 wherein the simultaneous heating and evaporation step g) of the aqueous medium is inserted at any one point in step d).

20. Process according to claim 18 wherein said simultaneous heating and evaporation step g) is inserted at any point in evaporation section P of step c) when step c) is provided with the same number of flash evaporators $FT_1$ to $FT_n$ as provided in evaporation section a) and the same number of heaters $H_0$, $H_1$ to $H_n$ as in heating step d).

21. Process according to claim 18 wherein said simultaneous heating and evaporation step g) is inserted simultaneously at any one point in steps c) and d) when step c) is provided with the same number of flash evaporators $FT_1$ to $FT_n$ as provided in evaporation step a) and the same number of heaters $H_0$, $H_1$ to $H_n$ as in heating step d).

22. Process according to claim 18 wherein the aqueous medium is fed to the simultaneous heating and evaporation step g) to be heated and/or evaporated from the heating step d) after it has been fed with live steam in heater $H_0$ of step d) and provides the aqueous medium for bauxite digestion at the temperature and concentration required for said digestion.

23. Process according to claim 18 wherein the simultaneous heating and evaporation step g) of the aqueous medium is conducted with the aqueous medium from heater $H_0$ after it has been fed with live steam and the heated and/or concentrated aqueous medium is then fed to a successively arranged heater in heating step d).

24. Process according to claim 18 wherein the simultaneous heating and evaporation step g) of the aqueous medium from the first stage of the heating is fed with flash vapor from step a) and said aqueous medium is then delivered to the heating step after having been fed with live steam, where it is heated and/or concentrated.

25. Process according to claim 18 wherein the simultaneous heating and evaporation step g) of the aqueous medium to be heated and/or evaporated from the first stage of the heating is fed with flash vapor from step a), said aqueous medium is then delivered to the heating stage and fed with live steam whereby the aqueous medium is raised to a higher temperature, said aqueous medium is recovered from the heating stage, fed with live steam and is further heated and/or concentrated and the heated and/or concentrated aqueous medium is then fed to the digestion for digestion of further bauxite ore.

26. Process according to claim 18 wherein in instances where the evaporation section P of step c) includes a multiple effect, the simultaneous heating and evaporation section of step g) is inserted in step d).

27. Process according to claim 18 wherein the simultaneous heating and evaporation step g) of the aqueous medium is fed with live steam and the vapor that the simultaneous heating and evaporation produces is utilized in step g).

28. Process according to claim 18 wherein the vapor produced in the simultaneous heating and evaporation step g) is fed to at least one of the heating stages $H_0$, $H_1$ to $H_n$ of step d) when step a) is equipped with the same number of flash evaporators $FT_1$ to $FT_n$ in step a) as heaters in heating step d).

29. Process according to claim 26 wherein the vapor produced in the simultaneous heating and evaporation step g) is in addition consumed in the specific evaporation section P of step c).

30. Process according to claim 18 wherein the vapor produced in the simultaneous heating and evaporation step g) is in addition consumed in at least one additional heater inserted for this purpose between at least two of the heaters $H_0$, $H_1$ to $H_n$ in step d).

31. Process according to claim 18 wherein the vapor produced in the simultaneous heating and evaporation step g) is in addition consumed to heat the spent liquor of step b) used in the preparation of bauxite ore slurry prior to the bauxite ore digestion and/or to produce water having a temperature of between 80 to 90° C.

32. Process according to claim 18 wherein the simultaneous heating and evaporation step g) of the aqueous medium is carried out in at least one stage, each stage comprising one or several simultaneous heating and evaporation means operating in series or in parallel.

33. Process according to claim 32 wherein the simultaneous heating and evaporation step g) of the aqueous medium is carried out in at least two stages and wherein the vapor generated by one of the simultaneous heating and evaporating stages is used to feed the simultaneous heating and evaporation stage directly preceding it.

34. Process according to claim 32 wherein live steam is fed to the first simultaneous heating and evaporation stage of said simultaneous heating and evaporation step g) for heating the aqueous medium.

35. Process according to claim 32 wherein one of the simultaneous heating and evaporation sections for heating and evaporating the aqueous medium of step g) is located following the final heater of step d) and another of said simultaneous heating and evaporation sections for heating and evaporating aqueous medium is inserted between the outlet of heater $H_1$ of step d) and the introduction of live steam into the heater $H_0$ of step d).

36. Process according to claim 32 wherein one of the simultaneous heating and evaporation sections for heating and evaporating the aqueous medium of step g) is located at the outlet of heater $H_0$ and two other simultaneous heating and evaporation sections are inserted between the outlet of heater $H_1$ of step d) and the inlet of live steam into the heater $H_0$ in step f).

37. Process according to claim 18 wherein in the simultaneous heating and evaporating step g), a vertical falling film of aqueous medium is used, heated by vapor, and wherein the said film generates vapor in situ which is thereafter separated from the aqueous medium resulting from the simultaneous heating and evaporation.

38. Process according to claim 18 wherein aqueous medium is heated by direct contact of said aqueous medium with heated vapor injection.

39. Process according to claim 38 wherein the aqueous medium intended for use in bauxite ore digestion is heated in at least one stage by heated vapor injection, and wherein the stage is located at the inlet of the simultaneous heating and evaporation step g).

40. Process according to claim 38 wherein in each of the direct contact heating stages, vapor generated by each of the simultaneous heating and evaporation stages for the aqueous medium is utilized.

41. Process according to claim 18 wherein the vapor produced in at least one of the simultaneous heating and evaporation stages of the simultaneous heating and evaporation step g) is compressed to raise its pressure to that of the operating pressure in the said stage of the simultaneous heating and evaporation of step g).

* * * * *